US012014858B2

(12) United States Patent
Inaba

(10) Patent No.: US 12,014,858 B2
(45) Date of Patent: Jun. 18, 2024

(54) REACTOR

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Kazuhiro Inaba, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 548 days.

(21) Appl. No.: 17/289,839

(22) PCT Filed: Oct. 9, 2019

(86) PCT No.: PCT/JP2019/039924
§ 371 (c)(1),
(2) Date: Apr. 29, 2021

(87) PCT Pub. No.: WO2020/090397
PCT Pub. Date: May 7, 2020

(65) Prior Publication Data

US 2021/0407725 A1 Dec. 30, 2021

(30) Foreign Application Priority Data

Oct. 29, 2018 (JP) ................................ 2018-203073

(51) Int. Cl.
*H01F 17/04* (2006.01)
*H01F 3/08* (2006.01)
(Continued)

(52) U.S. Cl.
CPC ............ *H01F 27/255* (2013.01); *H01F 3/08* (2013.01); *H01F 3/14* (2013.01); *H01F 27/28* (2013.01); *H01F 37/00* (2013.01); *H01F 41/12* (2013.01)

(58) Field of Classification Search
CPC ...................................................... H01F 27/28
(Continued)

(56) References Cited

U.S. PATENT DOCUMENTS 9,984,810 B2 5/2018 Yamamoto et al.
10,665,386 B2 5/2020 Hirabayashi et al.
(Continued)

FOREIGN PATENT DOCUMENTS

JP 2010-45112 A 2/2010
JP 2012-222089 A 11/2012
(Continued)

OTHER PUBLICATIONS

English translation of JP201045112 (Year: 2010).*
International Search Report, Application No. PCT/JP2019/039924, dated Jan. 7, 2020. ISA/Japan Patent Office.

*Primary Examiner* — Ronald Hinson
(74) *Attorney, Agent, or Firm* — Honigman LLP

(57) ABSTRACT

A reactor includes a coil, a magnetic core, and a resin molded portion. The coil includes two winding portions and a linking portion connecting the two winding portions to each other. The magnetic core includes inner core portions disposed inside the winding portions, and outer core portions disposed outside the winding portions. At least one of the two outer core portions includes a composite core. The composite core has a portion protruding upward in the height direction relative to a virtual surface obtained by extending an outer circumferential surface of the inner core portions, and includes a first composite core in which the compact made of the composite material is disposed on an
(Continued)

upper side in the height direction, and the powder compact is stacked on a lower side in the height direction. The resin molded portion includes a first outer resin portion covering the first composite core.

8 Claims, 6 Drawing Sheets

(51) Int. Cl.

| | |
|---|---|
| ***H01F 3/14*** | (2006.01) |
| ***H01F 27/255*** | (2006.01) |
| ***H01F 27/28*** | (2006.01) |
| ***H01F 37/00*** | (2006.01) |
| ***H01F 41/12*** | (2006.01) |

(58) Field of Classification Search
USPC .......................................................... 336/221
See application file for complete search history.

(56) References Cited

U.S. PATENT DOCUMENTS

| | | | | |
|---|---|---|---|---|
| 2013/0038415 | A1* | 2/2013 | Ooishi | H01F 37/00 336/61 |
| 2016/0314888 | A1 | 10/2016 | Zheng et al. | |
| 2017/0154719 | A1* | 6/2017 | Inaba | H01F 41/0246 |

FOREIGN PATENT DOCUMENTS

| | | | |
|---|---|---|---|
| JP | 2013-143454 | A | 7/2013 |
| JP | 2013-219318 | A | 10/2013 |
| JP | 2015-122456 | A | 7/2015 |

* cited by examiner

REACTOR

CROSS-REFERENCE TO RELATED APPLICATIONS

This application is the U.S. national stage of PCT/JP2019/039924 filed on Oct. 9, 2019, which claims priority of Japanese Patent Application No. JP 2018-203073 filed on Oct. 29, 2018, the contents of which are incorporated herein.

TECHNICAL FIELD

The present disclosure relates to a reactor.

BACKGROUND

JP 2017-135334A discloses a reactor that is to be used in an in-vehicle converter or the like and includes a coil having a pair of winding portions, and a magnetic core having a plurality of core pieces that are combined together in an annular shape, and a resin molded portion. The plurality of core pieces include a plurality of inner core pieces that are respectively disposed inside the winding portions, and two outer core pieces that are disposed outside the winding portions. The resin molded portion covers an outer circumferential surface of the magnetic core. A portion of the resin molded portion that is present inside the winding portions is interposed between adjacent inner core pieces and forms a resin gap portion.

There is demand for small reactors that are unlikely to be magnetically saturated.

As described above, if a resin gap portion is provided between core pieces, a reactor is unlikely to be magnetically saturated even when a large current is used. However, it is difficult to further reduce the size thereof. If the resin gap portion is omitted, it is possible to reduce the length of the reactor along the axial direction of the winding portions. In this respect, the reactor is likely to be magnetically saturated even though the size of the reactor is reduced.

In view of this, this disclosure aims to provide a small reactor that is unlikely to be magnetically saturated.

SUMMARY

A reactor according to this disclosure includes: a coil; a magnetic core; and a resin molded portion covering at least a portion of an outer circumferential surface of the magnetic core. The coil includes two winding portions and a linking portion for connecting the two winding portions to each other. The magnetic core includes inner core portions respectively disposed inside the winding portions, and outer core portions are disposed outside the two winding portions. At least one of the two outer core portions includes a composite core whose height direction is orthogonal to an axial direction of the winding portions and a direction in which the two winding portions are arranged side-by-side, and in which a compact made of a composite material containing magnetic powder and resin and a powder compact made of magnetic powder are stacked in the height direction. The linking portion protrudes outward in the axial direction and upward in the height direction relative to end portions of the inner core portions, on one end side in the axial direction of the two winding portions. The composite core is disposed on the one end side in the axial direction of the two winding portions, and has a portion that protrudes upward in the height direction relative to a virtual surface obtained by extending an outer circumferential surface of the inner core portions, and includes a first composite core in which the compact made of the composite material is disposed on an upper side in the height direction. The powder compact is stacked on a lower side in the height direction, and the resin molded portion includes a first outer resin portion covering the first composite core.

Advantageous Effects of Disclosure

The reactor according to this disclosure is small in size and unlikely to be magnetically saturated.

DETAILED DESCRIPTION OF PREFERRED EMBODIMENTS

Figure 1:
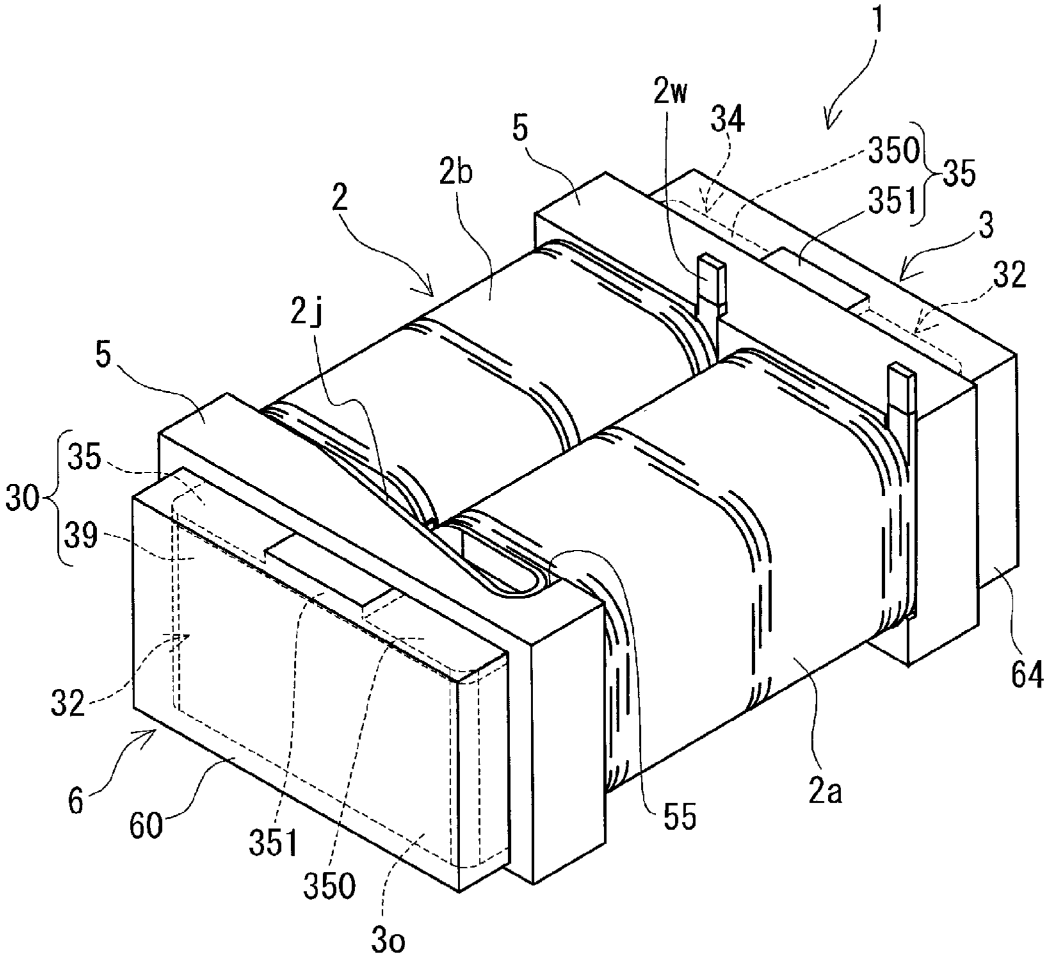
FIG. 1 is a schematic perspective view showing a reactor of Embodiment 1.

First, embodiments according to this disclosure will be listed and described.

A reactor according to one aspect of this disclosure includes: a coil; a magnetic core; and a resin molded portion covering at least a portion of an outer circumferential surface of the magnetic core. The coil includes two winding portions and a linking portion for connecting the two winding portions to each other. The magnetic core includes inner core portions respectively disposed inside the winding portions, and outer core portions disposed outside the two winding portions. At least one of the two outer core portions includes a composite core whose height direction is orthogonal to an axial direction of the winding portions and a direction in which the two winding portions are arranged side-by-side, and in which a compact made of a composite material containing magnetic powder and resin and a powder compact made of magnetic powder are stacked in the height direction. The linking portion protrudes outward in the axial direction and upward in the height direction relative to end portions of the inner core portions, on one end side in the axial direction of the two winding portions. The composite core is disposed on the one end side in the axial direction of the two winding portions, and has a portion that protrudes upward in the height direction relative to a virtual surface obtained by extending an outer circumferential surface of the inner core portions, and includes a first composite core in which the compact made of the composite material is disposed on an upper side in the height direction. The powder compact is stacked on a lower side in the height direction. The resin molded portion includes a first outer resin portion covering the first composite core.

The reactor according to this disclosure is small in size and unlikely to be magnetically saturated as described above due to the reactor being provided with a composite core that includes a compact made of a composite material and a powder compact.

Magnetic Characteristics

A compact made of a composite material contains a comparatively large amount of resin, which is a nonmagnetic material. The compact made of a composite material contains resin in an amount of 10 vol % or more, for example. Therefore, typically, the compact made of a composite material has a lower relative magnetic permeability and is less likely to be magnetically saturated, compared to a powder compact. Thus, a magnetic core that includes the above-described composite core is likely to have a lower relative magnetic permeability and is less likely to be magnetically saturated, compared to a magnetic core that does not include a compact made of a composite material and is composed of a powder compact. In this respect, typically, the reactor according to this disclosure is unlikely to be magnetically saturated even if a large current is used, while having a gapless structure in which no gap plate or resin gap portion described above is provided. As a result, even if a large current is used, the reactor according to this disclosure can maintain a predetermined inductance. Also, a magnetic core that includes the above-described composite core is likely to reduce magnetic flux leaking to the outside, compared to a magnetic core that does not include a powder compact and is composed of a compact made of a composite material. Thus, loss resulting from leakage flux is reduced. Therefore, the reactor according to this disclosure has low loss.

Size Reduction

If a magnetic core that includes the above-described composite core has the same inductance as a magnetic core that does not contain a powder compact and is composed of a compact made of a composite material, the volume of the magnetic core that includes the composite core can be reduced compared to the magnetic core composed of the compact. In particular, in the reactor of this disclosure, out of the two outer core portions, an outer core portion on the one end side of the winding portions, that is, on a side on which the linking portion is disposed, includes the first composite core. Also, the first composite core includes a portion that protrudes upward in the height direction relative to the inner core portion, that is, toward the side on which the linking portion is disposed. Here, typically, with a conventional reactor, an upper surface of an inner core portion in a height direction thereof and an upper surface of an outer core portion in the height direction, that is, a surface of the outer core portion on the side on which the linking portion is disposed, are flush with each other. Such a uniform structure may refer to FIG. 4 in JP 2017-135334A, for example. With such a conventional reactor, the space surrounded by a surface of the outer core portion on the linking portion side, end surfaces of the two winding portions, and a virtual surface obtained by extending an upper surface of an outer circumferential surface of the two winding portions in the height direction is a dead space. The protruding portion of the first composite core on the linking portion side is disposed in the above-described dead space. The axial length of a magnetic core can be made shorter than that of the above-described conventional reactor due to the height of the first composite core being increased by utilizing the dead space. As a result, the axial length of the reactor of this disclosure can be shortened. The above-described axial length refers to the length of the reactor extending along the axial direction of the winding portions.

The first composite core includes a compact made of a composite material on an upper side in the height direction, that is, on the linking portion side. Here, the compact made of a composite material can be formed into various three-dimensional shapes through injection molding or the like, and the shape thereof has a higher degree of freedom than a powder compact does. Thus, the compact made of a composite material can be readily formed into a shape corresponding to the shape of a portion near the linking portion. In this respect, the above-described dead space can be readily utilized, and as a result, the axial length of the magnetic core can be readily shortened.

The axial length of the magnetic core can be readily shortened due to the reactor having the gapless structure as described above.

Furthermore, the reactor of this disclosure has high manufacturability as described below.

The first composite core is a stacked article of a compact made of a composite material and a powder compact. Therefore, two compacts, i.e., the compact made of a composite material and the powder compact, can be independently molded. If the powder compact has a simple shape such as a rectangular cuboid shape, for example, the powder compact can be readily and accurately molded. The compact made of a composite material can be readily and accurately molded through injection molding or the like, even if the compact has a shape corresponding to the shape of a portion near the above-described linking portion, and corresponding to a surface of the compact made of a composite material that is in contact with the powder compact. Thus, both the compact made of a composite material and the powder compact have high manufacturability. Also, if a surface forming the interface between the two compacts is a flat surface, the two compacts can be readily stacked together without gaps. In this respect as well, the reactor of this disclosure has high manufacturability.

After the compact made of a composite material and the powder compact are stacked together, the stacked article is formed into a single body through a simple process of covering the stacked article with a resin molded portion, in particular, a first outer resin portion. In this respect as well, the reactor of this disclosure has high manufacturability.

According to one aspect of a reactor of this disclosure, a thickness of a central portion of the compact made of the composite material that constitutes the first composite core located in the direction in which the two winding portions are arranged side-by-side is larger than a thickness of two end portions located in the direction in which the two winding portions are arranged side-by-side.

Magnetic flux is more likely to pass through the central portion of the outer core portion in the direction in which the two winding portions are arranged side-by-side than the two end portions in the direction in which the two winding portions are arranged side-by-side. In the above-described aspect, the portion through which magnetic flux is likely to pass is locally thick, and thus magnetic saturation is unlikely to occur even if a large current is used. Also, in the above-described aspect, due to a locally thick portion being provided, it is possible to make the magnetic core smaller and reduce the weight of the magnetic core by shortening the axial length of the magnetic core.

According to one aspect of the reactor of this disclosure, the linking portion is obtained by bending a portion of a winding wire constituting the two winding portions, the first composite core has a recess in which the linking portion is disposed, and the compact made of the composite material that constitutes the first composite core constitutes at least a portion of an inner circumferential surface forming the recess.

In the above-described aspect, due to the recess being provided, it is possible to readily increase the height of the first composite core by utilizing the dead space while avoiding contact between the linking portion of the coil and the first composite core. In this respect, in the above-described aspect, magnetic saturation is unlikely to occur, and the axial length of the magnetic core can be readily shortened, thus reducing the size of the reactor. Also, in the above-described aspect, at least a portion of the inner circumferential surface forming the recess is composed of the compact made of the composite material, and thus the recess having a shape corresponding to the linking portion can be readily molded. The reactor according to the above-described aspect has better manufacturability in that the first composite core having a recess can be readily molded.

According to one aspect of the reactor of this disclosure, a frame-shaped holding member for holding end surfaces of the two winding portions and the first composite core is provided, and the holding member is formed as a single body with the compact made of the composite material that constitutes the first composite core.

By assembling the holding member and the powder compact in the above-described aspect, it is possible to stack the compact made of the composite material and the powder compact together and to attach the holding member to the resulting stacked article simultaneously. Also, the stacked state of the above-described stacked article can be readily maintained by the holding member. In this regard, the reactor according to the above-described aspect has higher manufacturability.

According to one aspect of the reactor of this disclosure, the composite core is disposed on another end side in the axial direction of the two winding portions, and includes a second composite core having a portion that protrudes in the height direction relative to the virtual surface of the inner core portions, the resin molded portion includes a second outer resin portion covering the second composite core, and the compact made of the composite material that constitutes the second composite core is provided with an overhang portion that protrudes outward in the axial direction of the winding portions relative to the powder compact that constitutes the second composite core.

In the above-described aspect, the content ratio of the compact made of the composite material in the magnetic core is high because the first composite core and the second composite core are provided. In this respect, in the above-described aspect, magnetic saturation is less likely to occur. Also, in the above-described aspect, the overhang portion can be used as a terminal block, for example. The reactor according to such an aspect is small in that the axial length of the reactor that includes the terminal block can be readily shortened.

According to one aspect of the reactor of this disclosure, the inner core portions include a compact made of a composite material containing magnetic powder and resin.

In the above-described aspect, the content ratio of the compact made of the composite material in the magnetic core is higher because the inner core portion also contains the compact made of the composite material, in addition to the first composite core. In this respect, in the above-described aspect, magnetic saturation is less likely to occur.

According to one aspect of the reactor of this disclosure, a relative magnetic permeability of the compact made of the composite material ranges from 5 to 50, and a relative magnetic permeability of the powder compact is two times or more the relative magnetic permeability of the compact made of the composite material.

In the above-described aspect, the size of the reactor can be more readily reduced while the reactor has a larger inductance, compared to a reactor including a magnetic core composed of a compact made of a composite material and not including a powder compact. Also, in the above-described aspect, the relative magnetic permeability of the compact made of the composite material is comparatively low. In such an aspect in which the reactor includes the compact made of a composite material with a low magnetic permeability, magnetic saturation is unlikely to occur. Furthermore, in the above-described aspect, it is possible to reduce leakage flux between the compact made of the composite material and the powder compact. In this respect, in the above-described aspect, it is possible to reduce loss resulting from the above-described leakage flux.

According to one aspect of the reactor according to the aspect described above, the relative magnetic permeability of the powder compact ranges from 50 to 500.

In the above-described aspect, it is possible to secure a large difference in the relative magnetic permeability between the compact made of the composite material and the powder compact. Therefore, in the above-described aspect, it is possible to more readily reduce leakage flux between the compact made of the composite material and the powder compact, thus further reducing loss.

The following describes embodiments of this disclosure in more detail with reference to the drawings. The same reference numerals in the drawings indicate objects having the same names.

Embodiment 1

A reactor 1 according to Embodiment 1 will be described mainly with reference to FIGS. 1 to 4.

FIG. 1 is a perspective view schematically showing the reactor 1 according to Embodiment 1, showing a state in which the reactor 1 is disposed such that a linking portion **2*j* connecting winding portions 2*a* and 2*b* of a coil 2** to each other is located on the lower-left diagonal side in the paper plane.

Figure 2:
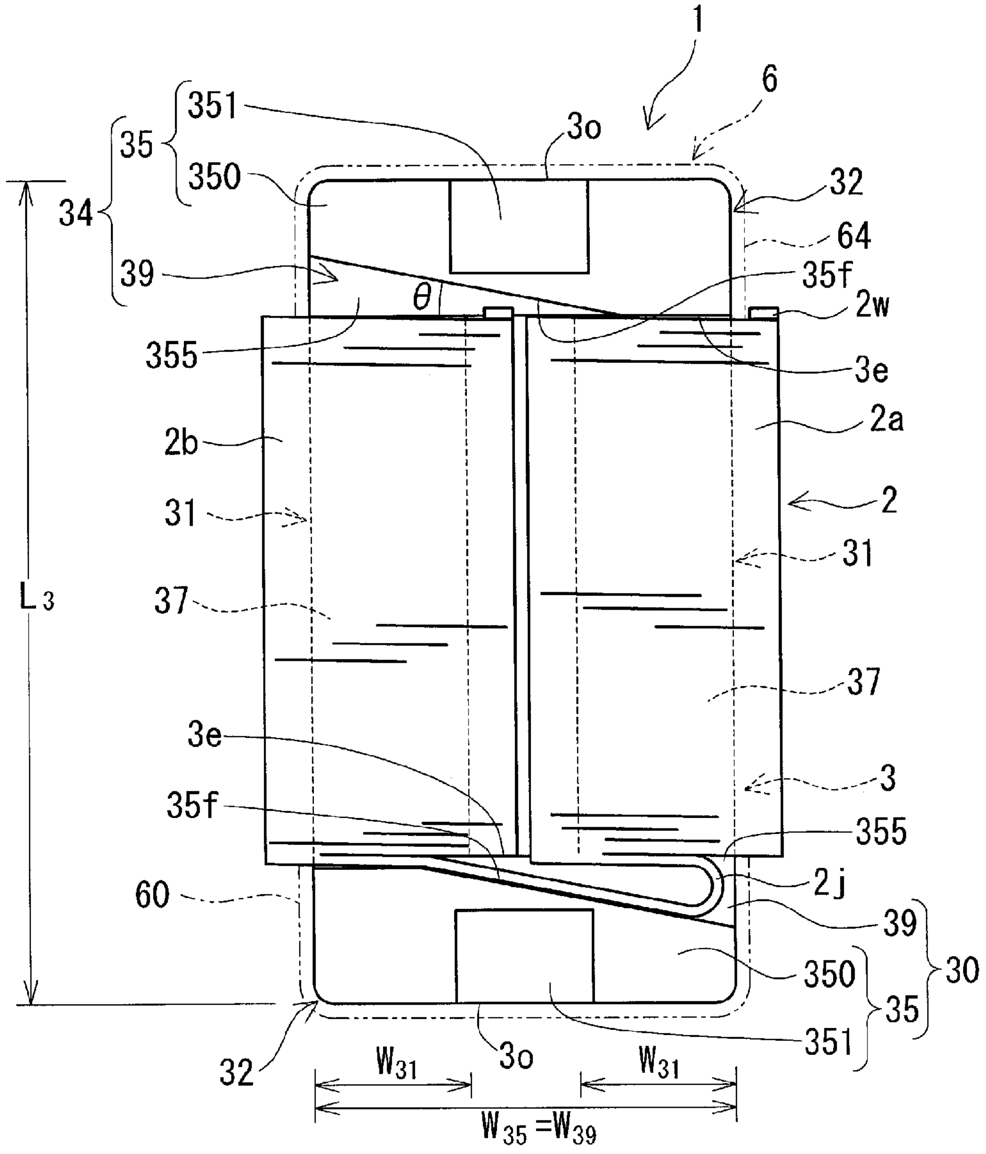
FIG. 2 is a schematic perspective view showing the reactor of Embodiment 1.

FIG. 2 is a plan view of the reactor 1 according to Embodiment 1, when viewed from a direction orthogonal to both the axial direction of the winding portions **2*a* and 2*b* and a direction in which the two winding portions 2*a* and 2*b* are arranged side-by-side. FIG. 2 virtually shows a resin molded portion 6 using line-double dashed lines, omitting a holding member 5** for easy understanding.

Figure 3:
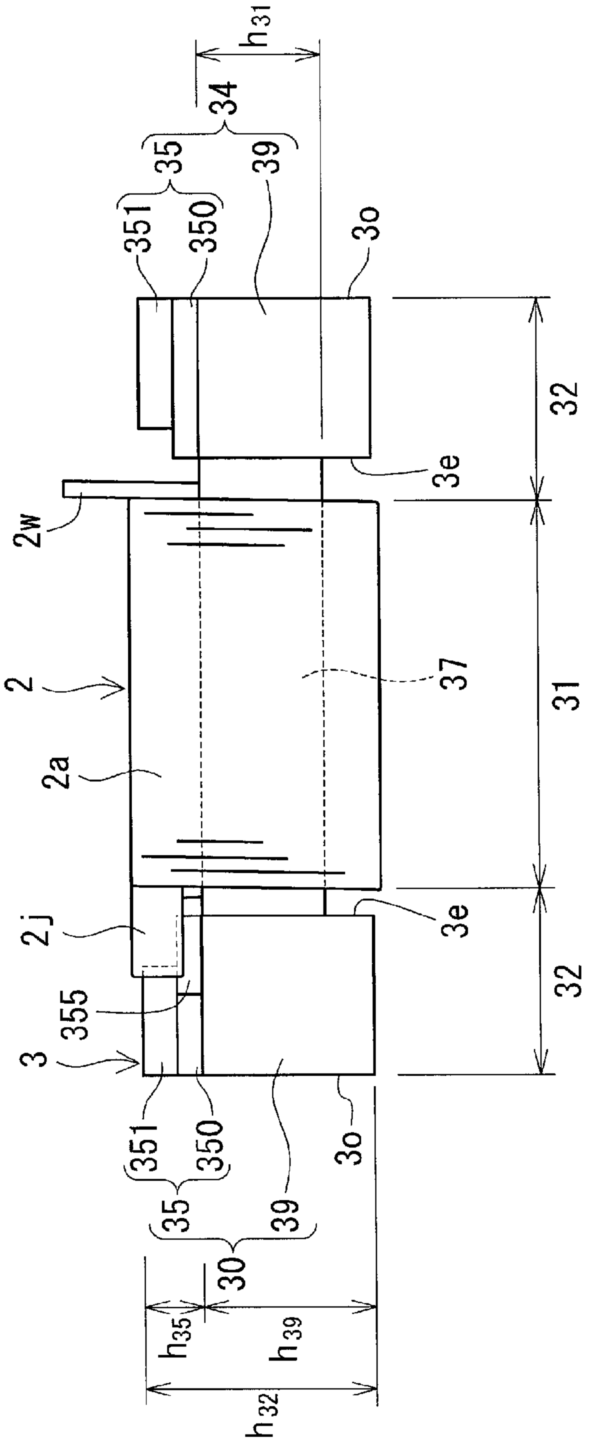
FIG. 3 is a schematic side view showing the reactor of Embodiment 1.

FIG. 3 is a side view of the reactor 1 according to Embodiment 1, when viewed from the winding portion **2*a* side in the direction in which the two winding portions 2*a* and 2*b* are arranged side-by-side. The holding member 5 and the resin molded portion 6 are not shown in FIG. 3 so that a magnetic core 3** can be easily seen.

Figure 4:
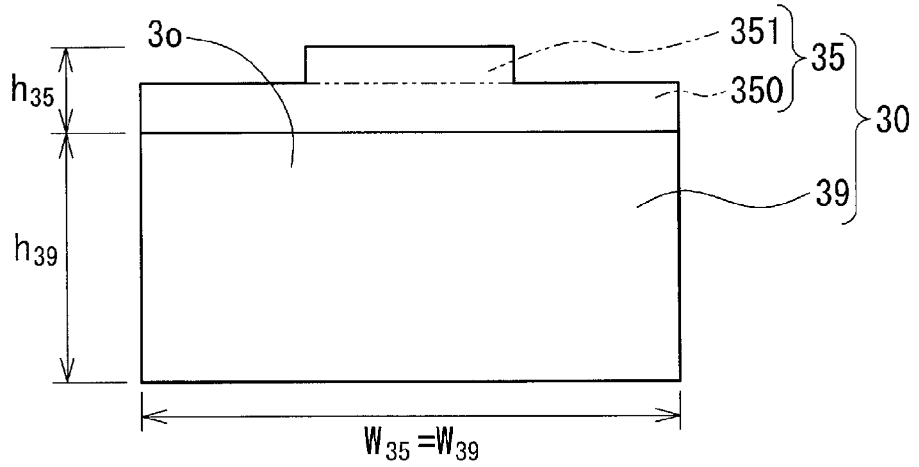
FIG. 4 is a schematic front view of a first composite core provided in the reactor of Embodiment 1, when viewed from the outer end surface side in an axial direction of winding portions of the coil.

FIG. 4 is a front view of a first composite core 30 provided in the reactor 1 of Embodiment 1, when viewed from an outer end surface 3*o* side in the axial direction of the winding portions 2*a* and 2*b*.

A description will be given below where the side where the reactor 1 is installed is located on the lower side of the paper plane in FIGS. 1, 3, and 4, and on the back side in the vertical direction of the paper plane in FIG. 2. This installation direction is an example, and can be changed as appropriate.

Overview

As shown in FIG. 1, the reactor 1 according to Embodiment 1 includes the coil 2, the magnetic core 3, and the resin molded portion 6. The coil 2 includes the two winding portions 2*a* and 2*b*. The two winding portions 2*a* and 2*b* are disposed such that the two winding portions 2*a* and 2*b* are arranged side-by-side, and the axes thereof are parallel to each other (FIG. 2). The coil 2 includes the linking portion 2*j* connecting the two winding portions 2*a* and 2*b*. The magnetic core 3 is disposed inside and outside the winding portions 2*a* and 2*b*. As shown in FIG. 2, the magnetic core 3 includes inner core portions 31 respectively disposed inside the winding portions 2*a* and 2*b*, and outer core portions 32 disposed outside the two winding portions 2*a* and 2*b*. The magnetic core 3 forms an annular closed magnetic circuit together with the inner core portions 31 and the outer core portions 32. Each inner core portion 31 is disposed such that the axial direction thereof extends along the axial direction of the winding portions 2*a* and 2*b*. The two inner core portions 31 are held by the outer core portion 32 disposed on the one end side of the two winding portions 2*a* and 2*b*, i.e., on the lower side of the paper plane in FIG. 2, and the outer core portion 32 disposed on the other end side of the two winding portions 2*a* and 2*b*, i.e., on the upper side of the paper plane in FIG. 2. The resin molded portion 6 covers at least a portion of the outer circumferential surface of the magnetic core 3. Typically, such a reactor 1 is attached to an installation target (not shown) such as a converter case and then is used.

In particular, with the reactor 1 according to Embodiment 1, at least one of the above-described two outer core portions 32 includes a composite core in which different types of core members are stacked together. Specifically, a description will be given with reference to FIG. 3. A direction that is orthogonal to both the axial direction of the winding portions 2*a* and 2*b* and the direction in which the two winding portions 2*a* and 2*b* are arranged side-by-side is referred to as a "height direction". On the one end side in the axial direction of the two winding portions 2*a* and 2*b*, the linking portion 2*j* is provided protruding outward in the axial direction of the two winding portions 2*a* and 2*b* and upward in the height direction relative to the end portions of the inner core portions 31. The composite core is formed by stacking a compact 35 made of a composite material containing magnetic powder and resin, and a powder compact 39 made of magnetic powder together in the height direction. The reactor 1 includes the following first composite core 30 as one composite core. The resin molded portion 6 includes a first outer resin portion 60 covering the first composite core 30 (FIGS. 1 and 2). Note that the axial direction of the above-described winding portions 2*a* and 2*b* corresponds to the left-right direction in the paper plane in FIG. 3. The direction in which the two winding portions 2*a* and 2*b* are arranged side-by-side corresponds to a direction orthogonal to the paper plane in FIG. 3. The direction orthogonal to the above-described axial direction and the direction in which the two winding portions 2*a* and 2*b* are arranged side-by-side corresponds to the up-down direction of the paper plane in FIG. 3. The outer side in the axial direction corresponds to the left side in the paper plane in FIG. 3, and the upper side in the height direction corresponds to the upper side in the paper plane in FIG. 3. The one end side in the axial direction corresponds to the left side in the paper plane in FIG. 3, and the other end side in the axial direction, which will be described later, corresponds to the right side in the paper plane in FIG. 3.

The first composite core 30 is disposed on the one end side in the axial direction of the two winding portions 2*a* and 2*b*. Also, the composite core 30 has a portion that protrudes upward in the height direction relative to a virtual surface obtained by extending the outer circumferential surface of the inner core portions 31. The compact 35 made of the composite material is disposed on the upper side in the height direction, and the powder compact 39 is stacked on the lower side in the height direction in the composite core 30. The composite core 30 of this example includes two compacts in total, namely, one compact 35 made of the composite material and one powder compact 39. Furthermore, the composite core 30 of this example also has a portion that protrudes downward in the height direction relative to the above-described virtual surface in the inner core portions 31. A maximum height $h_{32}$ of the composite core 30 is larger than a height $h_{31}$ of the inner core portions 31.

The magnetic core 3 of this example includes a second composite core 34 disposed on the other end side of the two winding portions 2*a* and 2*b*, as another composite core. The second composite core 34 has a portion that protrudes in the height direction relative to the above-described virtual surface of the inner core portions 31. The composite core 34 of this example has a portion that protrudes upward and downward in the height direction of the inner core portions 31. A maximum height $h_{32}$ of the composite core 34 is larger than a height $h_{31}$ of the inner core portions 31. Also, each inner core portion 31 of this example includes a compact 37 made of a composite material. Furthermore, the magnetic core 3 of this example has a gapless structure in which no magnetic gap is provided. The "magnetic gap" here refers to a solid body such as a gap plate (e.g., an alumina plate) or the above-described resin gap portion, and a hollow body such as an air gap. A joining material such as an adhesive for joining the compact 35 made of a composite material and the powder compact 39 together is not considered as a magnetic gap.

The magnetic core 3 that includes the compact 35 made of a composite material and the powder compact 39 contributes to reducing magnetic saturation by reducing relative magnetic permeability to some extent. Also, the first composite core 30 having a portion that protrudes upward in the height direction relative to the inner core portions 31, that is, a portion that protrudes toward the linking portion 2*j* side, shortens an axial length $L_3$ (FIG. 2) of the magnetic core 3, by utilizing the dead space formed around the linking portion 2*j* in a conventional reactor. Such a composite core 30 contributes to reducing the size of the magnetic core 3.

The following describes each constituent element in detail.

Note that, in the following description, a "height direction" refers to a direction that is orthogonal to both the axial direction of the above-described winding portions 2*a* and 2*b* and the direction in which the winding portions 2*a* and 2*b* are arranged side-by-side in a state in which the reactor 1 is installed. The length extending along the height direction is referred to as a height.

The axial direction of the magnetic core 3 refers to a direction extending along the axial direction of the inner core portions 31. Here, the axial direction of the inner core portions 31 extends along the axial direction of the winding portions 2*a* and 2*b*, and is substantially parallel thereto. The length extending along the above-described axial direction is referred to as an axial length.

The width direction is a direction that is orthogonal to the above-described height direction and the above-described axial direction. Here, the width direction of the magnetic core 3 extends in the direction in which the two winding portions 2*a* and 2*b* are arranged side-by-side. The length extending along the above-described width direction is referred to as a width.

Coil

The coil 2 includes the tubular winding portions 2*a* and 2*b* and the linking portion 2*j*. In the coil 2 of this example, the winding portions 2*a* and 2*b* are formed by helically winding one continuous winding wire 2*w*. The linking portion 2*j* is formed by a portion of the winding wire 2*w* extending between the winding portions 2*a* and 2*b*. The linking portion 2*j* electrically connects the two winding portions 2*a* and 2*b* to each other in series, and mechanically connects the two winding portions 2*a* and 2*b* to each other.

The linking portion 2*j* of this example is obtained by bending a portion of the winding wire 2*w* that constitutes the two winding portions 2*a* and 2*b*. Specifically, the linking portion 2*j* is formed by folding, at one end portion of one winding portion 2*a*, the winding wire 2*w* back toward the one end side of the other winding portion 2*b* (FIG. 2). Due to the winding wire 2*w* being folded back, the linking portion 2*j* has a portion locally protruding from end surfaces of the two winding portions 2*a* and 2*b* outward in the axial direction of the two winding portions 2*a* and 2*b*, that is, a portion locally protruding downward in FIG. 2. Such a linking portion 2*j* protrudes outward in the above-described axial direction relative to end portions of the inner core portions 31. Also, the linking portion 2*j* is provided such that a surface of the linking portion 2*j* located on the upper side in the height direction thereof is at substantially the same height as a surface of the outer circumferential surface of the two winding portions 2*a* and 2*b* located on the upper side in the height direction. Such a linking portion 2*j* protrudes upward in the height direction relative to the surface located on the upper side in the height direction of the virtual surface obtained by extending the outer circumferential surface of the inner core portions 31. The above-described surface located on the upper side in the height direction refers to an upper surface in FIG. 3, and, here, refers to a surface that is located opposite to the installation side.

The shape of the two winding portions 2*a* and 2*b* on the one end side is an uneven shape corresponding to the shape of the above-described linking portion 2*j*. The shape of the two winding portions 2*a* and 2*b* on the other side is a comparatively flat shape formed mainly by end surfaces of the two winding portions 2*a* and 2*b*. Therefore, the shape of the two winding portions 2*a* and 2*b* on the one end side is more complex than the shape thereof on the other end side.

An example of the winding wire 2*w* is a covered wire provided with a conductor wire and an insulating sheath covering the outer circumference of the conductor wire. An example of the constituent material of the conductor wire is copper. An example of the constituent material of the insulating sheath is a resin such as polyamide imide. Specific examples of the covered wire include a covered flat wire having a rectangular cross-sectional shape, and a covered round wire having a circular cross-sectional shape. A specific example of the winding portions 2*a* and 2*b* composed of a flat wire is an edgewise coil.

The winding wire 2*w* of this example is a covered flat wire. The winding portions 2*a* and 2*b* of this example are square tubular edgewise coils. Also, in this example, the winding portions 2*a* and 2*b* have the same specifications such as the shape, winding direction, and number of turns.

The shapes, sizes and the like of the winding wire 2*w*, and the winding portions 2*a* and 2*b* can be changed as appropriate. The shape of the winding portions 2*a* and 2*b* may be cylindrical, for example. Alternatively, the specifications of the winding portions 2*a* and 2*b* may be different from each other, for example. Note that end portions of the winding wire 2*w* drawn out from the winding portions 2*a* and 2*b*, i.e., the right end portions thereof in FIGS. 1 and 3, are used as portions to which an external device such as a power source is connected.

Magnetic Core

Overview

As shown in FIG. 2, the magnetic core 3 of this example has portions disposed in the winding portions 2*a* and 2*b*, and includes four columnar members in total, namely, members that mainly constitute the inner core portions 31, and members that are disposed outside the winding portions 2*a* and 2*b* and mainly constitute the outer core portions 32. Also, the members that mainly constitute the inner core portions 31 include the compacts 37 made of a composite material. The members that mainly constitute the outer core portions 32 include the first composite core 30 and the second composite core 34. One end surface of each compact 37 made of the composite material and an inner end surface 3*e* of the composite core 30 are connected to each other. The other end surface of the compact 37 made of the composite material and an inner end surface 3*e* of the composite core 34 are connected to each other. The above-described four members are formed into an annular shape due to this connection.

As in this example, if the members that mainly constitute the inner core portions 31 and the members that constitute the outer core portions 32 are independent members, the degree of freedom of the constituent material of each member can be increased. Thus, the magnetic characteristics thereof can be easily adjusted. The magnetic core 3 of this example has a gapless structure. In the magnetic core 3 of this example, the constituent material of the members that mainly constitute the inner core portions 31 and the constituent material of the members that mainly constitute the outer core portions 32 are different from each other. Also, in this example, the constituent materials of the members that constitute the inner core portions 31 are the same. In this example, the constituent material of the first composite core 30 is the same as the constituent material of the second composite core 34. The constituent material of each member and the number of members can be changed as appropriate. Changed configurations may refer to Variations A to C, which will be described later, and the like. The constituent materials will be described later in detail.

Outer Core Portion

As shown in FIG. 3, the first composite core 30 mainly constitutes the one end side in the axial direction of the winding portions 2*a* and 2*b*, namely, the outer core portion 32 disposed on the linking portion 2*j* side. The composite core 30 is formed by stacking different types of core members, namely, the compact 35 made of a composite material and the powder compact 39, together in the height direction. The compact 35 made of the composite material is disposed on the upper side in the height direction of the composite core 30, that is, on the linking portion 2*j* side. The powder compact 39 is disposed on the lower side in the height direction of the composite core 30. The lower side in the height direction is located opposite to the linking portion 2*j*, and corresponds to the installation side here. Also, the composite core 30 has a portion that protrudes in the height direction relative to the inner core portions 31. Therefore, the maximum height $h_{32}$ of the composite core 30 is larger than the height $h_{31}$ of the inner core portions 31. That is, $h_{31}<h_{32}$ holds true.

The second composite core 34 mainly constitutes the outer core portion 32 disposed on the other end side in the axial direction of the winding portions 2*a* and 2*b*, that is, on a side opposite to the linking portion 2*j* side. Similarly to the above-described first composite core 30, the composite core 34 of this example includes a stacked article of different types of core members, and has a portion that protrudes in the height direction relative to the inner core portions 31.

In this example, the first composite core 30 and the second composite core 34 have the same shape, the same size, the same composition, and the same structure. Hereinafter, a description will be given with reference to the first composite core 30.

The first composite core 30 of this example has a substantially rectangular cuboid shape (FIG. 1), and is rectangular in a plan view in the height direction (FIG. 2). However, the composite core 30 of this example has a portion having a step shape whose height changes locally in a plan view in the width direction (see also FIGS. 3 and 4). The step-shaped portion protrudes upward in the height direction relative to the surface on the upper side in the height direction of the virtual surface obtained by extending the outer circumferential surface of the inner core portions 31 in the composite core 30 (FIG. 3). That is to say, the step-shaped portion protrudes toward the linking portion 2*j* side relative to the virtual surface in the inner core portion 31. Further, the composite core 30 of this example also has a portion that protrudes toward a surface located on the lower side in the height direction of the virtual surface obtained by extending the outer circumferential surface of the inner core portions 31, specifically, toward the lower side in the height direction relative to the lower surface in FIG. 3 (FIG. 3). That is to say, the composite core 30 has a portion that protrudes toward a side located opposite to the linking portion 2*j* relative to the virtual surface in the inner core portion 31. The portion protruding to the side opposite to the linking portion 2*j* has a simple rectangular cuboid shape (FIG. 3).

In the first composite core 30 of this example, a portion having a comparatively complex shape such as the above-described step shape is composed of the compact 35 made of a composite material. Also, in the composite core 30 of this example, the portion connected to the inner core portions 31 and the portion that protrudes to the side opposite to the linking portion 2*j* relative to the inner core portion 31 are composed of the powder compact 39.

Shape of Compact

The powder compact 39 of this example has a rectangular cuboid shape (FIGS. 1, 3, and 4), which is a simple shape. Thus, the powder compact 39 can be readily and accurately molded. One surface of the outer circumferential surface of the powder compact 39 that is disposed on the upper side in the height direction, namely, the upper surface in FIGS. 3 and 4, is a surface on which the compact 35 made of a composite material is stacked. Hereinafter, this upper surface is referred to as an upper surface of the powder compact 39. Also, a surface of the outer circumferential surface of the powder compact 39 that constitutes a portion of the inner end surface 3*e* is a surface that is in contact with end surfaces of the compacts 37 made of the composite material that mainly constitute the inner core portions 31 (FIG. 3).

The compact 35 made of the composite material in this example is present on the upper side in the height direction relative to the upper surface of the powder compact 39. However, this compact 35 made of the composite material does not protrude from the outer circumferential surface of the powder compact 39 in the width direction or the axial direction of the magnetic core 3. A maximum width $W_{35}$ and the maximum axial length of the compact 35 made of the composite material are respectively equal to a width $W_{39}$ and the maximum axial length of the powder compact 39 (FIGS. 2 to 4). The maximum axial length corresponds to the length in the up-down direction in FIG. 2 and the length in the left-right direction in FIG. 3. The compact 35 made of the composite material in this example has a shape corresponding to the upper surface of the powder compact 39, and corresponding to the shape of a portion near the linking portion 2*j*. Specifically, the compact 35 made of the composite material of this example has a base portion 350 stacked on the upper surface of the powder compact 39, and a protruding portion 351 located locally higher than the base portion 350 (FIGS. 2 to 4). Also, the composite core 30 of this example has a recess 355 in which the linking portion 2*j* is disposed (FIGS. 2 and 3). The compact 35 made of the composite material constitutes a portion of the inner circumferential surface of the recess 355. Note that, although the second composite core 34 has the recess 355, the linking portion 2*j* is not disposed in the recess 355 (FIG. 2).

The base portion 350 of this example has a polygonal columnar shape obtained by cutting off one corner portion of a comparatively flat rectangular cuboid provided with a rectangular surface having the same shape and the same size as the upper surface of the powder compact 39 (FIG. 2). In this example, the base portion 350 of the second composite core 34 may also be referred to. One surface of the base portion 350, namely, the lower surface in FIGS. 3 and 4, is a surface that is in contact with the upper surface of the powder compact 39. Hereinafter, this lower surface is referred to as a lower surface of the base portion 350, or the lower surface of the compact 35 made of the composite material. The lower surface of the base portion 350 forms a boundary between the compact 35 made of the composite material and the powder compact 39 together with the upper surface of the powder compact 39. The other surface opposite to the lower surface of the base portion 350, namely, the upper surface in FIGS. 3 and 4, is provided with the protruding portion 351. Hereinafter, this upper surface is referred to as the upper surface of the base portion 350.

The base portion 350 of this example has an inclined surface 35*f* that intersects with the width direction of the base portion 350 and the axial direction of the magnetic core 3, as one surface that connects the lower surface of the base portion 350 and the upper surface of the base portion 350 (FIG. 2). The inclined surface 35*f* is provided to extend from an intermediate position located in the axial direction at a side edge of the base portion 350 in the width direction of the base portion 350 to an intermediate position of the inner end surface 3*e* located in the width direction. A right-angled triangular space formed by this inclined surface 35*f* and a portion of the upper surface of the powder compact 39 is the recess 355. An inclination angle θ of the inclined surface 35*f* to the inner end surface 3*e* substantially corresponds to an inclination angle of the portion where the linking portion 2*j* is folded back, relative to the end surfaces of the winding portions 2*a* and 2*b*. The maximum distance of the inclined surface 35*f* from the inner end surface 3*e* substantially corresponds to the length of the above-described folded-back portion protruding from the end surfaces of the winding portions 2*a* and 2*b*. Therefore, the recess 355 can favorably accommodate the linking portion 2*j*. Also, because the recess 355 is composed of the compact 35 made of the composite material and the powder compact 39, the compact 35 made of the composite material can be readily formed into a somewhat simple shape. Therefore, the compact 35 made of a composite material has high manufacturability. Note that the recess 355 may also be formed by the compact 35 made of the composite material. This configuration may refer to Embodiment 4, which will be described later.

The protruding portion 351 of this example has a rectangular cuboid shape, and is disposed near the outer end surface 3*o* (FIGS. 2 and 3) at a central portion (FIGS. 2 and 4) located in the width direction of the base portion 350. The compact 35 made of the composite material provided with such a protruding portion 351 is formed such that the thickness of the central portion in the width direction is larger than the thickness of the two end portions in the width direction. Here, the thickness refers to the length extending along the height direction, and corresponds to the height. Here, magnetic flux is more likely to pass through the central portions of the outer core portions 32 in the width direction than the end portions in the width direction. The magnetic core 3 is unlikely to be magnetically saturated due to the protruding portions 351 being provided at portions through which magnetic flux is likely to pass. Also, flux leaking from the outer core portions 32 to the outside can be readily reduced due to the protruding portions 351 being provided near the outer end surfaces 3*o*. In this respect, the magnetic core 3 is likely to have low loss. Furthermore, due to a locally thick portion being provided by the protruding portion 351, the weight of the magnetic core 3 can be reduced while the axial length $L_3$ of the magnetic core 3 is shorter than in a case where the compact 35 made of the composite material has the same thickness overall.

In this example, the lower surface of the compact 35 made of the composite material and the upper surface of the powder compact 39 are composed of rectangular flat surfaces, and are disposed orthogonally to the height direction. If the above-described two surfaces are flat surfaces, the compact 35 made of the composite material and the powder compact 39 can be readily stacked together without gaps in the manufacturing process. Also, if the above-described two surfaces are flat surfaces disposed orthogonally to the height direction, the compact 35 made of the composite material and the powder compact 39 can be stably and readily stacked together in the height direction.

In this example, as described above, the interface formed by the lower surface of the compact 35 made of the composite material and the upper surface of the powder compact 39 is orthogonal to the height direction, and thus, is disposed substantially parallel to the direction of magnetic flux. The direction of magnetic flux extends along the axial direction of the winding portions 2*a* and 2*b*, and corresponds to the left-right direction in the paper plane in FIG. 3. Also, the above-described interface is located at substantially the same height as that of the surface of the outer circumferential surface of the inner core portions 31 on the upper side in the height direction. It is conceivable that, when the interface is substantially parallel to the direction of magnetic flux, even if a minute gap is present between the compact 35 made of the composite material and the powder compact 39, for example, a gap with a size of 0.1 mm or less is present therebetween, the influence thereof on the magnetic path is practically negligible. It is conceivable that the influence thereof on the magnetic path is small because the above-described interface is located at a portion of the inner core portion 31 other than the end surfaces thereof, here, at a portion other than the end surfaces of the compact 37 made of the composite material. Therefore, the above-described minute gap is allowable. Note that the interface may be provided to intersect with the direction of magnetic flux. However, it is preferable that the interface is substantially parallel to the direction of magnetic flux as in this example, in consideration of the influence thereof on the magnetic path, workability obtained when the compact and the powder compact are stacked together, and the like. The position of the interface may be located at the position of an end surface of the inner core portions 31. This configuration may refer to Embodiments 4 and 5, which will be described later.

Size of Compact

The size of members that constitute the outer core portions 32, and the size of members that constitute the inner core portions 31, which will be described later, are adjusted according to the constituent materials and the like, such that the reactor 1 satisfies predetermined magnetic characteristics.

The size of the powder compacts 39 that constitute the first composite core 30 and the second composite core 34 is as follows.

The width $W_{39}$ of the powder compact 39 is larger than the sum of the widths $W_{31}$ of the two inner core portions 31 that are adjacent to each other and arranged side-by-side (FIG. 2). That is, $2 \times W_{31} < W_{39}$ holds true.

The height $h_{39}$ of the powder compact 39 is larger than the height of the inner core portions 31, here, the height $h_{31}$ of the compact 37 made of the composite material (FIG. 3). That is, $h_{31} < h_{39}$ holds true. The height $h_{39}$ of the powder compact 39 is the sum of the height $h_{31}$ of the inner core portion 31 and the length of the powder compact 39 that protrudes from the inner core portion 31 downward in the height direction. In this example, the protruding length of the powder compact 39 satisfies the following. The above-described protruding length refers to the distance from a surface of the virtual surface located on the lower side in the height direction to a surface of the powder compact 39 located on the lower side in the height direction, the virtual surface being obtained by extending the outer circumferential surface of the inner core portions 31, in the powder compact 39. The above-described surface located on the lower side in the height direction refers to a lower surface in FIG. 3, and, here, corresponds to a surface located on the installation side. The protruding length of this example is of a size with which the surface of the powder compact 39 located on the lower side in the height direction is flush with the surface of the outer circumferential surface of the winding portions 2*a* and 2*b* located on the lower side in the height direction.

The area of the surface of the powder compact 39 that constitutes the inner end surface 3*e* is larger than the total area of the end surfaces of the two inner core portions 31.

The size of the powder compacts 35 that constitute the first composite core 30 and the second composite core 34 is as follows.

A region of the base portion 350 on the outer end surface 3*o* side has the maximum width, and the width thereof continuously decreases from an intermediate position of the magnetic core 3 in the axial direction toward the inner end surface 3*e* according to the inclined surface 35*f* (FIG. 2). The maximum width of the base portion 350 is equal to the maximum width $W_{35}$ of the compact 35 made of the composite material. Therefore, the maximum width of the base portion 350 is equal to the width $W_{39}$ of the powder compact 39 (FIG. 4).

A region of the base portion 350 on the one end side in the width direction has the maximum axial length, and the axial length thereof is continuously shortened from the intermediate position in the width direction toward the other end side in the width direction according to the inclined surface 35*f* (FIG. 2). A region on the left end side of the first composite core 30 shown in FIG. 2 in the width direction has the maximum axial length, and the axial length thereof is shortened from the intermediate position in the width direction toward the right end side, for example.

The maximum axial length of the base portion 350 is equal to the maximum axial length of the powder compact 39 (FIGS. 2 and 3).

The base portion 350 has a height to the extent that the base portion 350 extends from the upper surface of the powder compact 39 to the vicinity of a lower end of the linking portion 2*j* in the height direction (FIG. 3).

The width of the protruding portion 351 is smaller than the maximum width of the base portion 350 (FIGS. 2 and 4). The width of the protruding portion 351 ranges from 20% to 60% of the maximum width of the base portion 350, for example.

The axial length of the protruding portion 351 is shorter than the maximum axial length of the base portion 350. An inner edge of the protruding portion 351 does not reach the inner end surface 3*e* or the inclined surface 35*f* (FIG. 2). The axial length of the protruding portion 351 ranges from 40% to 75% of the maximum axial length of the base portion 350, for example.

The protruding portion 351 has a height to the extent that the protruding portion 351 extends from the vicinity of the lower end of the linking portion 2*j* in the height direction to the vicinity of the upper end thereof (FIG. 3). The sum of the height of the base portion 350 and the height of the protruding portion 351, that is, the height $h_{35}$ of the compact 35 made of the composite material, is about a height from a surface of the inner core portions 31 located on the upper side in the height direction relative to the above-described virtual surface to a surface of the outer circumferential surface of the winding portions 2*a* and 2*b* located on the upper side in the height direction (FIG. 3). The height $h_{35}$ of the compact 35 made of the composite material ranges from 30% to 60% of the height $h_{31}$ of the inner core portions 31, for example.

By adjusting the width, axial length, and height of the protruding portion 351 in the above-described ranges, a large volume of the protruding portion 351 can be readily secured while avoiding interference with the linking portion 2*j*. The magnetic core 3 is unlikely to be magnetically saturated due to the protruding portion 351 having a large volume. In particular, as long as the width of the protruding portion 351 is smaller than the width of the base portion 350 and satisfies the above-described range, it is possible to further increase the height of the protruding portion 351, and as a result, further increase the height $h_{35}$ of the compact 35 made of the composite material. Thus, as described above, a large volume of the compact 35 made of a composite material can be readily secured in a central portion of the composite cores 30 and 34 located in the width direction through which magnetic flux is likely to pass. As a result, the magnetic core 3 is less likely to be magnetically saturated.

The size of the above-described powder compact 39 and the size of the compact 35 made of the composite material can be changed as appropriate in a range in which the reactor 1 satisfies predetermined magnetic characteristics. The maximum width $W_{35}$ of the compact 35 made of the composite material may be smaller than the width $W_{39}$ of the powder compact 39. This configuration may refer to Embodiment 6 and FIG. 8A, which will be described later. Alternatively, the maximum axial length of the compact 35 made of the composite material may be smaller than the maximum axial length of the powder compact 39. Alternatively, the maximum axial length of the compact 35 made of the composite material may be somewhat larger than the maximum axial length of the powder compact 39. This configuration may refer to Embodiments 4 and 5, which will be described later, and second composite cores 34C and 34D shown in FIGS. 6 and 7.

The content ratio of the compact 35 made of the composite material to the total volume of the first composite core 30 can be selected as appropriate in a range in which the reactor 1 satisfies predetermined magnetic characteristics. The content ratio ranges from 5 vol % to 70 vol %, for example. The remaining portion refers to a volume ratio of the powder compact 39 thereto. While it depends on the relative magnetic permeability of the compact 35 made of the composite material and the relative magnetic permeability of the powder compact 39, as a result of the volume ratio of the compact 35 made of the composite material satisfying the above-described range, the magnetic core 3 is unlikely to be magnetically saturated even if the magnetic core 3 has a gapless structure.

The shapes, sizes, structures, and the like of the members that mainly constitute the outer core portions 32, here, mainly the first composite core 30 and the second composite core 34, can be changed as appropriate. Variations of Embodiments 2 to 6 etc., which will be described later, will be described in more detail. In addition, as disclosed in JP 2017-135334A, the members that constitute the outer core portion 32 may be a columnar body having a dome shape, a trapezoidal shape, or the like in a plan view in the height direction.

Inner Core Portion

In this example, the compacts 37 made of the composite material are respectively disposed mainly in the winding portions 2*a* and 2*b*. End portions of the compacts 37 made of the composite material are disposed outside the winding portions 2*a* and 2*b* together with the first composite core 30 and the second composite core 34 to constitute the outer core portions 32 (FIG. 3). Each compact 37 made of the composite material is a single article that does not have a magnetic gap and is composed of the composite material, such as a gap plate.

In this example, the compacts 37 made of the composite material have the same shape, the same size, and the same composition. Specifically, the compacts 37 made of the composite material have a rectangular cuboid shape. The outer circumferential shape of the compacts 37 made of the composite material is substantially similar to the inner circumferential shape of the winding portions 2*a* and 2*b*. The axial length of each compact 37 made of the composite material is slightly longer than the axial length of each of the winding portions 2*a* and 2*b*. Therefore, when the compacts 37 made of the composite material and the coil 2 are assembled, the end portions of the compacts 37 made of the composite material protrude from the winding portions 2*a* and 2*b*. Therefore, the end surfaces of the compacts 37 made of the composite material, the inner end surface 3*e* of the first composite core 30, and the inner end surface 3*e* of the second composite core 34 readily come into contact with each other.

The shapes, sizes, structures, and the like of the members that constitute the inner core portions 31, here, mainly the compacts 37 made of the composite material, can be changed as appropriate. The shape of the members that constitute the inner core portions 31 may be a round columnar shape, a polygonal columnar shape, or the like, for example. Alternatively, with regard to the members that constitute the inner core portions 31, at least a portion of a corner portion thereof may be C-chamfered or R-chamfered, for example. The chamfered corner portion is unlikely to be chipped, and the members that constitute the inner core portions 31 have high mechanical strength. Alternatively, the member that constitutes one inner core portion 31 may be constituted by a plurality of core pieces, for example. However, if the number of members that constitute one inner core portion 31 is one as in this example, the number of assembly parts is small, and the reactor 1 has high manufacturability.

Constituent Material

Compact Made of Composite Material

The compacts 35 and 37 made of the composite material contain magnetic powder and resin. Magnetic powder is dispersed in the resin. Such compacts 35 and 37 can be manufactured using an appropriate molding method such as injection molding, or cast molding. Typically, a raw material containing magnetic powder and resin is prepared, a mold is filled with the fluid raw material, and the fluid raw material is solidified, for example. Powder made of a soft magnetic material, powder provided with a coating layer made of an insulating material or the like on the surface of powder particles, or the like can be used as the magnetic powder. Examples of the soft magnetic material include metals such as iron and iron alloys, and nonmetals such as ferrite. Examples of the iron alloys include Fe—Si alloys and Fe—Ni alloys.

With regard to the compacts 35 and 37 made of the composite material, the content of the magnetic powder in the composite material ranges from 30 vol % to 80 vol %, for example. The content of the resin in the composite material ranges from 10 vol % to 70 vol %, for example. The higher the content of the magnetic powder and the lower the content of the resin, the easier it is to increase the saturation flux density and the relative magnetic permeability, and the easier it is to improve the heat dissipation. If there is demand for improvement in the saturation flux density, relative magnetic permeability, or heat dissipation, for example, the content of the magnetic powder therein may be 50 vol % or more, 55 vol % or more, or 60 vol % or more. The lower the content of the magnetic powder and the higher the content of the resin, the easier it is to improve the electrical insulating properties, and the easier it is to reduce eddy current loss. In the manufacturing process, the composite material has high flowability. If there is demand for reduction in loss and improvement in the flowability, for example, the content of the magnetic powder therein may be 75 vol % or less, or 70 vol % or less. Alternatively, the resin content may exceed 30 vol %.

As described above, the saturation flux density and the relative magnetic permeability of the compacts 35 and 37 made of the composite material can be readily changed not only according to the content of the magnetic powder and the content of the resin as described above, but also according to the composition of the magnetic powder. It is preferable to adjust the composition of the magnetic powder, the content of the magnetic powder, the content of the resin, and the like such that the reactor 1 has predetermined magnetic characteristics such as a predetermined inductance, for example.

Examples of the resin in the composite material of the compacts 35 and 37 made of the composite material include thermosetting resins, thermoplastic resins, room temperature curable resins, and low-temperature curable resins. Examples of the thermosetting resin include unsaturated polyester resins, epoxy resins, urethane resins, and silicone resins. Examples of the thermoplastic resin include polyphenylene sulfide (PPS) resins, polytetrafluoroethylene (PTFE) resins, liquid crystal polymers (LCPs), polyamide (PA) resins (e.g., nylon 6 and nylon 66), polybutylene terephthalate (PBT) resins, and acrylonitrile butadiene styrene (ABS) resins. In addition, a BMC (Bulk Molding Compound) obtained by mixing calcium carbonate and glass fiber with unsaturated polyester, millable silicone rubber, millable urethane rubber, and the like can also be used.

The compacts 35 and 37 made of the composite material may also contain powder composed of nonmagnetic material, in addition to magnetic powder and resin. Examples of the nonmagnetic material include ceramic materials such as alumina and silica, and various metals. The heat dissipation of the compacts 35 and 37 made of the composite material can be improved due to the compacts 35 and 37 containing powder composed of a nonmagnetic material. Also, powder made of a nonmetal and nonmagnetic material such as a ceramic material is preferable because such powder has high electrical insulating properties. The content of powder made of a nonmagnetic material ranges from 0.2 mass % to 20 mass %, for example. The above-described content may also range from 0.3 mass % to 15 mass %, or from 0.5 mass % to 10 mass %, for example.

The compacts 35 and 37 made of the composite material may have the same composition or different compositions. If the compacts 35 and 37 made of the composite material have the same composition, the magnetic characteristics of the magnetic core 3 can be easily adjusted. Furthermore, in this case, the manufacturing conditions can be easily adjusted, and the compacts 35 and 37 made of the composite material also have high manufacturability.

Powder Compact

The powder compact 39 is an aggregate of magnetic powder. A typical example of the powder compact 39 is a powder compact obtained by compression molding a powder mixture containing the above-described magnetic powder and a binder into a predetermined shape, and subjecting the resulting mixture to heat treatment. A resin or the like can be used as the binder. The content of the binder is about 30 vol % or less, for example. If heat treatment is performed, the binder is lost or thermally denatured. Therefore, the content ratio of the magnetic powder in the powder compact 39 can be more easily increased than that in the compacts 35 an 37 made of the composite material. The content ratio of the magnetic powder in the powder compact 39 may exceed 80 vol %, or 85 vol % or more, for example. When the content ratio of the magnetic powder is high, the powder compact 39 is likely to have higher saturation flux density and higher relative magnetic permeability than the compacts 35 and 37 made of the composite material containing resin.

Magnetic Characteristics

The relative magnetic permeability of the compacts 35 and 37 made of the composite material ranges from 5 to 50, for example. The relative magnetic permeability of the compacts 35 and 37 made of the composite material may range from 10 to 45, or may be further reduced to 40 or less, 35 or less, or 30 or less, for example. The reactor 1 provided with the magnetic core 3 that includes the compacts 35 and 37 made of the composite material having such a low magnetic permeability is unlikely to be magnetically saturated.

The relative magnetic permeability of the powder compact 39 is preferably larger than the relative magnetic permeability of the compacts 35 and 37 made of the composite material. One reason therefor is that it is possible to reduce leakage flux between the compacts 35 and 37 made of the composite material and the powder compact 39. As a result, the reactor 1 has low loss because loss resulting from the above-described leakage flux is reduced. Another reason therefor is that the size of the reactor 1 can be more easily reduced while the reactor 1 has a larger inductance, compared to a case where the powder compact 39 and the compacts 35 and 37 made of the composite material have the same relative magnetic permeability ranging from 5 to 50, for example.

In particular, if the relative magnetic permeability of the powder compact 39 is two times or more the relative magnetic permeability of the compacts 35 and 37 made of the composite material, magnetic flux leaking between the compacts 35 and 37 made of the composite material and the powder compact 39 can be more reliably reduced. The larger the difference between the relative magnetic permeability of the compacts 35 and 37 made of the composite material and the relative magnetic permeability of the powder compact 39 is, the more readily the above-described leakage magnetic flux is reduced. If there is demand for reduction in loss, for example, the relative magnetic permeability of the powder compact 39 may be 2.5 times or more, 3 times or more, 5 times or more, or 10 times or more the relative magnetic permeability of the compacts 35 and 37 made of the composite material.

The relative magnetic permeability of the powder compact 39 ranges from 50 to 500, for example. The relative magnetic permeability of the powder compact 39 may be 80 or more, or further increased to 100 or more, 150 or more, or 180 or more. The powder compact 39 having such high magnetic permeability is likely to have a larger difference from the relative magnetic permeability of the compacts 35 and 37 made of the composite material. If the relative magnetic permeability of the compacts 35 and 37 made of the composite material is 50 and the relative magnetic permeability of the powder compact 39 is 100 or more, for example, the relative magnetic permeability of the powder compact 39 is two times or more the relative magnetic permeability of the compacts 35 and 37 made of the composite material. As described above, magnetic flux leaking between the compacts 35 and 37 made of the composite material and the powder compact 39 is more likely to be reduced due to the above-described large difference in the relative magnetic permeability therebetween, and the reactor 1 has lower loss.

Relative magnetic permeability here is obtained as follows.

A ring-shaped sample whose composition is similar to that of the compacts 35 and 37 made of the composite material and the powder compact 39 is produced. The size of the ring-shaped sample is as follows: the outer diameter is 34 mm, the inner diameter is 20 mm, and the thickness is 5 mm.

The ring-shaped sample is wound by a winding wire with 300 turns on the primary side and 20 turns on the secondary side, and the B—H initial magnetization curve is measured in a range of H=0 (Oe) to 100 (Oe).

The maximum B/H of the obtained B—H initial magnetization curve is obtained. This maximum value is regarded as relative magnetic permeability. A magnetization curve here refers to a so-called DC magnetization curve.

The relative magnetic permeability of the compacts 35 and 37 made of the composite material in this example ranges from 5 to 50. The relative magnetic permeability of the powder compact 39 ranges from 50 to 500, and two times or more the relative magnetic permeability of the compacts 35 and 37 made of the composite material.

Note that, because the first composite core 30 and the second composite core 34 of this example have the same composition, the compacts 35 made of the composite material provided in the composite cores 30 and 34 have substantially the same relative magnetic permeability. The powder compacts 39 provided in the composite cores 30 and 34 have the same relative magnetic permeability. Also, because the compacts 35 and 37 made of the composite material of this example have the same composition, the compacts 35 and 37 made of the composite material have the same relative magnetic permeability. As a result of the compacts 35 made of the composite material, the powder compacts 39, and the compacts 35 and 37 made of the composite material that are provided in the composite cores 30 and 34 having different compositions, the relative magnetic permeabilities thereof may be different from each other.

Holding Member

In addition, the reactor 1 may include holding members 5 interposed between the coil 2 and the magnetic core 3.

The holding members 5 are typically composed of an electrically insulating material, and contribute to improving the electrical insulating properties between the coil 2 and the magnetic core 3. Also, the holding members 5 hold the members that constitute the winding portions 2*a* and 2*b* and the inner core portions 31, and the members that constitute the outer core portions 32, and are used to position the above-described members to the winding portions 2*a* and 2*b*. Typically, the holding members 5 hold the members that constitute the inner core portions 31 to provide predetermined gaps to the winding portions 2*a* and 2*b*. The above-described gap can be used as a path through which a fluid resin flows in the process for manufacturing the resin molded portion 6. Such holding members 5 also contribute to securing the above-described flow path.

The reactor 1 of this example includes the holding member 5 for holding the one end surface of the two winding portions 2*a* and 2*b* and the first composite core 30, and the holding member 5 for holding the other end surface of the two winding portions 2*a* and 2*b* and the second composite core 34 (FIG. 1). The holding members 5 have the same basic configuration. Each holding member 5 of this example is a rectangular frame-shaped member that is disposed at end portions of the compacts 37 made of the composite material, the inner end surface 3*e* of the composite core 30 or 34, and the vicinity thereof. The holding members 5 will be simply described with reference to FIG. 8A, which will be described later. The holding member 5 is provided with the following through-holes 5*h*, support piece (not shown), groove portion (not shown) located on the coil side, and groove portion 52 located on the core side, for example. Hereinafter, the side of the holding member 5 on which the composite core 30 or 34 is disposed is referred to as the core side. The side of the holding member 5 on which the winding portions 2*a* and 2*b* are disposed is referred to as the coil side.

The through-holes 5*h* pass through each holding member 5 from the core side of the holding member 5 to the coil side of the holding member 5. The members that constitute the inner core portions 31, here, the end portions of the compacts 37 made of the composite material, are inserted into the through-holes 5*h*. The support piece protrudes from a portion of the inner circumferential surface forming a through-hole 5*h*, for example, a corner portion, toward the coil side. The support piece supports a portion of the outer circumferential surface of the compacts 37 made of the composite material, for example, a corner portion. If the compacts 37 made of the composite material are held by the support pieces, gaps that correspond to the thickness of the support piece are provided between the winding portions 2*a* and 2*b* and the compacts 37 made of the composite material. The gaps are used as the path through which a fluid resin flows as described above, and is provided with an inner resin portion, which is a portion of the resin molded portion 6 and will be described later. The inner resin portion is not shown in the drawings. The groove portion on the coil side is provided on the coil side of the holding member 5. The end surfaces of the winding portions 2*a* and 2*b* and the vicinities thereof are fitted to the groove portion located on the coil side. The groove portion 52 on the core side is provided on the core side of the holding member 5. A bottom portion 53 of the groove portion 52 is provided with the through-holes 5*h*. The inner end surface 3*e* of the composite core 30 or 34 and the vicinity thereof are fitted to the groove portion 52. A portion of the inner end surface 3*e* is in contact with the B-shaped bottom portion 53.

Furthermore, in this example, the holding member 5 disposed on the linking portion 2*j* side includes a recess 55 for accommodating the linking portion 2*j* (FIG. 1). The recess 55 is a right-angled triangular space that is similar to the recess 355 in the first composite core 30 and has a size capable of accommodating the linking portion 2*j*. The inclined surface 35*f* of the composite core 30 is disposed along a wall surface (not shown) forming the recess 55.

The shape, size, and the like of the holding member 5 can be changed as appropriate as long as the holding member 5 has the above-described functions. Also, a known configuration can be used for the holding member 5. The holding member 5 may include a member that is independent of the above-described frame-shape member and is disposed between the winding portions 2*a* and 2*b* and the members that constitute the inner core portions 31, for example. A similar shape may refer to the inner interposing portion 51 in JP 2017-135334A.

Examples of the constituent material of the holding member 5 include electrically insulating material such as resin. Specific examples of the resin may refer to the above-described item regarding the compact made of the composite material. Typical examples thereof include thermoplastic resins and thermosetting resins. The holding member 5 can be manufactured using a known molding method such as injection molding.

Resin Molded Portion

As a result of at least a portion of the magnetic core 3 being covered with the resin molded portion 6, the resin molded portion 6 functions to protect the magnetic core 3 from the external environment, mechanically protect the magnetic core 3, and improve electrical insulating properties between the magnetic core 3 and peripheral components such as the coil 2 and the reactor 1. If the magnetic core 3 is covered with the resin molded portion 6, and the outer circumference of the winding portions 2*a* and 2*b* is exposed as illustrated in FIG. 1, the reactor 1 also has good heat dissipation. The reason therefor is that the winding portions 2*a* and 2*b* can come into direct contact with a cooling medium such as a liquid refrigerant.

The resin molded portion 6 includes the first outer resin portion 60 covering the first composite core 30. The resin molded portion 6 of this example includes a second outer resin portion 64 covering the second composite core 34. Also, the resin molded portion 6 of this example includes an inner resin portion that covers at least portions of the compacts 37 made of the composite material, here, the inner core portions 31. Furthermore, the resin molded portion 6 of this example is a single molded article in which the inner resin portions that are present inside the winding portions 2*a* and 2*b* and the outer resin portions 60 and 64 that are present outside the winding portions 2*a* and 2*b* and cover the outer core portion 32 are continuous with each other.

The above-described stacked article is formed as a single body due to the composite cores 30 and 34 each provided with the article obtained by stacking the compact 35 made of the composite material and the powder compact 39 being respectively covered by the outer resin portions 60 and 64. Also, if the inner resin portions and the outer resin portions 60 and 64 form a single molded article, the members that constitute the magnetic core 3 are held as a single body. Therefore, the rigidity of the magnetic core 3 as a single article is increased by the resin molded portion 6, and the reactor 1 has high strength. In addition, if the holding member 5 includes a member disposed between the winding portions 2*a* and 2*b* and the members that constitute the inner core portions 31, for example, the resin molded portion 6 need not include the inner resin portions, and may substantially include only the outer resin portions 60 and 64.

The covering ranges, the thickness, and the like of the inner resin portion and the outer resin portions 60 and 64 can be selected as appropriate. The surface of the protruding portions 351 located on the upper side in the height direction are respectively exposed from the outer resin portions 60 and 64 of this example (FIG. 1), but the above-described upper surfaces may be covered thereby. Alternatively, the resin molded portion 6 may cover the entire outer circumferential surface of the magnetic core 3, for example. Alternatively, portions of the composite cores 30 and 34, such as the surface on the installation side, may be exposed without being covered as long as the outer resin portions 60 and 64 include portions that cover and extend over the interface between the compact 35 and the powder compact 39, for example. Alternatively, the resin molded portion 6 may have a substantially uniform thickness, or may have locally different thicknesses, for example.

Examples of the constituent material of the resin molded portion 6 include various resins. Examples thereof include thermoplastic resins. Examples of the thermoplastic resins include PPS resins, PTFE resins, LCP, PA resins, and PBT resins. In addition to the resins, the above-described constituent material may contain highly thermally conductive powder, or powder composed of the above-described non-magnetic material. The resin molded portion 6 containing the above-described powder has good heat dissipation. In addition, if the constituent resin of the resin molded portion 6 is the same as the constituent resin of the holding member 5, the resin molded portion 6 and the holding member 5 have good bondability. Also, because these members have the same coefficient of thermal expansion, separation, cracking, and the like of the resin molded portion 6 due to thermal stress are suppressed. Injection molding or the like can be used to mold the resin molded portion 6.

Method for Manufacturing Reactor

The reactor 1 according to Embodiment 1 can be manufactured as follows, for example. The first composite core 30, the second composite core 34, and the compacts 37 made of the composite material were prepared. The coil 2 and the magnetic core 3, and the holding members 5 as needed are assembled. The produced assembly is accommodated in a mold for molding the resin molded portion 6, and at least the composite cores 30 and 34 are covered with a fluid resin. The mold is not shown in the drawings.

Preferably, the compacts 35 made of the composite material and the powder compacts 39 are prepared and stacked together to respectively prepare the first composite core 30 and the second composite core 34. If the compacts 35 made of the composite material that are provided in the composite cores 30 and 34 have the same shape, the same size, and the same composition as in this example, one mold can be shared to manufacture the compacts 35 made of the composite material. The same applies to the powder compacts 39 provided in the composite cores 30 and 34, and the compacts 37 made of the composite material disposed in the winding portions 2*a* and 2*b*. If the compact 35 made of the composite material and the powder compact 39 are fixed to each other by a joining material such as an adhesive, the composite cores 30 and 34 have high strength. Also, positional shift of the compacts and the like while manufacturing the resin molded portion 6 can be readily prevented by fixing the compacts with the joining material.

A one-way filling method in which a fluid resin is introduced from the outer end surface 3*o* of one outer core portion 32 toward the other outer core portion 32 can be used to manufacture the resin molded portion 6. Alternatively, a two-way filling method in which a fluid resin is introduced from the outer end surface 3*o* of the outer core portions 32 toward the inside of the winding portions 2*a* and 2*b* can be used.

Applications

The reactor 1 according to Embodiment 1 can be utilized in a component of a circuit for performing a voltage increasing operation and a voltage reducing operation, such as constituent components of various converters and power conversion devices, for example. Examples of the converter include in-vehicle converters mounted in vehicles such as hybrid automobiles, plug-in hybrid automobiles, electric automobiles, and fuel cell automobiles, and typical examples thereof include DC-DC converters and air-conditioner converters.

Main Effects

The reactor 1 according to Embodiment 1 includes the first composite core 30 that includes the compact 35 made of the composite material and the powder compact 39. The magnetic core 3 that includes the composite core 30 is likely to have a lower relative magnetic permeability than a magnetic core that is composed of a powder compact and does not include a compact made of a composite material. Even if a magnetic gap such as a gap plate is not provided, the reactor 1 of Embodiment 1 provided with such a magnetic core 3 is unlikely to be magnetically saturated when a large current is used. Also, this reactor 1 can suppress a decrease in inductance even if a large current is used. Furthermore, the magnetic core 3 includes the compacts 35 made of the composite material and the powder compacts 39. Therefore, the magnetic core 3 is more likely to reduce leakage of magnetic flux to the outside, compared to a magnetic core that is composed of a compact made of a composite material and does not include a powder compact. Such a reactor 1 has low loss.

Furthermore, the volume of the reactor 1 of Embodiment 1 can be further reduced due to the first composite core 30 being provided, compared to a reactor that is provided with a magnetic core that does not include a powder compact and is composed of a compact made of a composite material, and has the same inductance. In particular, the composite core 30 is disposed on the one end side of the winding portions 2*a* and 2*b*, that is, on the linking portion 2*j* side. Also, the composite core 30 has a portion that is disposed to fill the above-described dead space formed on the one end side of the winding portions 2*a* and 2*b*, that is, on the linking portion 2*j* side in a conventional reactor. Furthermore, at least a portion of the composite core 30 located near the linking portion 2*j* is composed of the compact 35 made of the composite material. Therefore, the composite core 30 can be easily molded into a shape corresponding to the shape near the linking portion 2*j*, and the above-described dead space can be easily and effectively utilized. The maximum height $h_{32}$ of the outer core portion 32 can be increased in the reactor 1 of Embodiment 1 provided with such a composite core 30, and the axial length $L_3$ of the magnetic core 3 can be made shorter than that of a conventional reactor. The axial length $L_3$ of the magnetic core 3 can be readily shortened due to the magnetic core 3 having the gapless structure. In this respect, the reactor 1 is small.

Also, the reactor 1 of Embodiment 1 has high manufacturability because the first composite core 30 can be easily manufactured. The reason for this is that the compact 35 made of the composite material and the powder compact 39 can be independently molded, and the composite core 30 has high manufacturability regarding the compacts. Also, the reactor 1 has high manufacturability because, after the two compacts are stacked together, the stacked article can be formed into a single body in a simple step of covering the stacked article with the resin molded portion 6.

Furthermore, the reactor 1 of this example has the following effects.

The reactor 1 is less likely to be magnetically saturated due to the following points.

The thickness of a central portion in the width direction of the compact 35 made of a composite material provided in the first composite core 30 is locally large. Therefore, a large volume of a portion of the outer core portion 32 through which magnetic flux is likely to pass is secured.

The members that include the second composite core 34 and constitute the two outer core portions 32 include the compacts 35 made of a composite material.

The members that constitute the inner core portions 31 include the compacts 37 made of the composite material.

The interfaces between the compacts 35 made of the composite material and the powder compacts 39 are arranged parallel to the direction of magnetic flux. Therefore, the influence of the interfaces on the magnetic path is substantially negligible, and predetermined magnetic characteristics can be maintained.

The reactor 1 is smaller due to the following points.

The first composite core 30 has a recess 355. Therefore, the height $h_{35}$ can be readily increased in a range such that the composite core 30 does not protrude from a surface of the outer circumferential surface of the winding portions 2*a* and 2*b* located on the upper side in the height direction while avoiding contact with the linking portion 2*j*. Thus, it is possible to increase the maximum height $h_{32}$ of the composite core 30. As a result, it is possible to further reduce the axial length $L_3$ of the magnetic core 3.

The entire region of the inner end surface 3*e* of the first composite core 30 to which end surfaces of the compacts 37 made of the composite material that mainly constitute the inner core portions 31 are connected is composed of the powder compact 39. Such a composite core 30 contains a large amount of the powder compact 39 having a higher relative magnetic permeability than the compact 35 made of the composite material. Therefore, it is possible to make the axial length of the composite core 30 shorter than in a case where a portion of the region connected to the inner core portions 31 is composed of the compact 35 made of a composite material.

The reactor 1 has high manufacturability due to the following points.

The powder compact 39 has a simple shape, and can be easily and accurately molded.

A recess 355 is formed by both the compact 35 made of the composite material and the powder compact 39. Therefore, the compact 35 made of the composite material also has a simple shape, and can be easily and accurately molded.

The lower surface of the compact 35 made of the composite material and the upper surface of the powder compact 39 are flat surfaces disposed orthogonally to the height direction. Thus, the two compacts can be readily stacked together without gaps.

The first composite core 30 and the second composite core 34 have the same shape and the same size, and can be manufactured using the same raw material under the same manufacturing conditions.

The members that are disposed inside the winding portions 2*a* and 2*b* and constitute the inner core portions 31, here, the compacts 37 made of the composite material, can be manufactured using the same raw material under the same manufacturing conditions.

The number of members that are disposed inside one winding portion 2*a* or 2*b* and constitute the inner core portion 31 is one, and the number of assembly parts of the magnetic core 3 and the number of assembly parts of the reactor 1 are small.

The reactor 1 has lower loss due to the following points.

Because the magnetic core 3 includes the compacts 37 made of the composite material, iron loss such as eddy current loss is further reduced, compared to a magnetic core that does not include a compact made of a composite material and is composed of a powder compact.

Magnetic flux leaking to the outside is suppressed due to the protruding portion 351 of the compact 35 made of the composite material being provided near the outer end surface 3*o*. Loss resulting from leakage flux is reduced in this respect as well.

With regard to the composite cores described in Embodiment 1, the shape, size, and the number of stacked compacts, and the like can be changed. The stacking state in the manufacturing process can be changed. Also, it is possible to change the shape and the like of the composite cores that constitute the outer core portions 32.

The following describes the differences from Embodiment 1 in detail, and the configurations and effects that are redundant with those of Embodiment 1 will not be described.

Embodiment 2

A reactor according to Embodiment 2 will be described with reference to FIG. 5A. Here, a first composite core 30A will be described in detail.

Figure 5A:
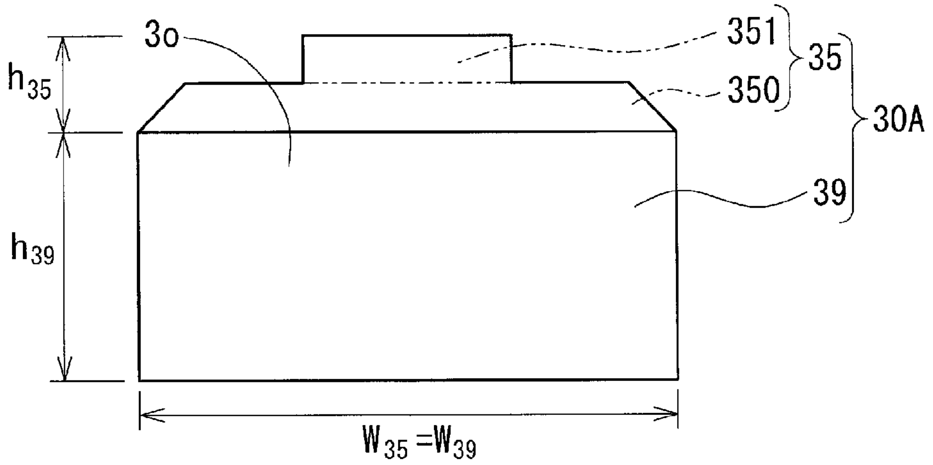
FIG. 5A is a schematic front view of another example of a first composite core provided in a reactor of Embodiment 2, when viewed from the outer end surface side in an axial direction of winding portions.
Figure 5B:
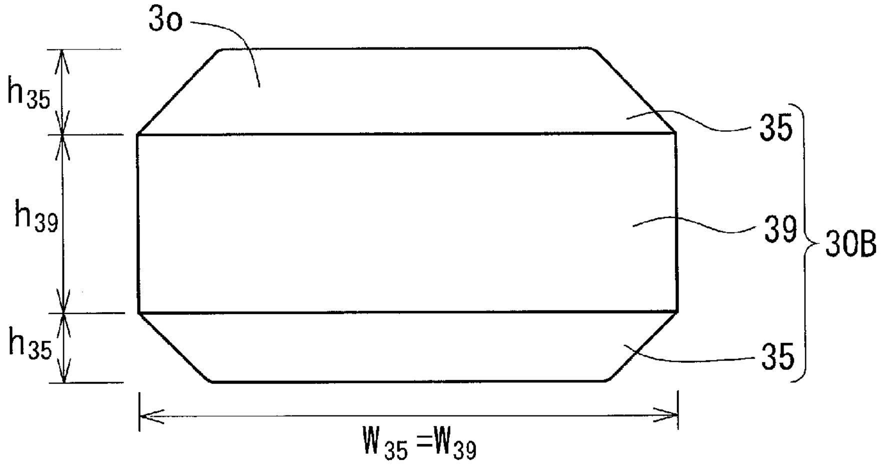
FIG. 5B is a schematic front view of still another example of a first composite core provided in a reactor of Embodiment 3, when viewed from an outer end surface side in an axial direction of winding portions.

FIG. 5A and FIG. 5B, which will be described later show only the first composite cores 30A and 30B, and the other constituent elements of the reactor are not shown therein. Similarly to FIG. 4, FIGS. 5A and 5B are front views of the first composite cores 30A and 30B when viewed from the outer end surface 3*o* side.

As with the first composite core 30A shown in FIG. 5A, corner portions of the base portion 350 in the compact 35 made of the composite material may be chamfered. Although FIG. 5A shows an example of the state in which two opposing corner portions of the comparatively flat rectangular cuboid base portion 350 are C-chamfered, the corner portions may be R-chamfered. The same applies to Embodiment 3, which will be described later. The compact 35 made of the composite material can be easily molded into such a chamfered shape.

Also, with the first composite core 30A shown in FIG. 5A, the volume of the corner portions removed through the above-described chamfering is added to the protruding portion 351. Therefore, the height $h_{35}$ of the composite core 30A shown in FIG. 5A is larger than the height $h_{35}$ of the first composite core 30 shown in FIG. 4. Here, magnetic flux is more likely to pass through the central portion of the outer core portion 32 in the width direction than the end portions in the width direction. In the composite core 30A shown in FIG. 5A, the volume of the protruding portion 351 located in the central portion in the width direction is larger, compared to the composite core 30 shown in FIG. 4. Therefore, the magnetic core provided with the composite core 30A is less likely to be magnetically saturated. Also, the composite core 30A from which the corner portions have been removed has higher strength.

Note that, if the second composite core is provided, although not shown, as described above, corner portions of the second composite core may be chamfered, or the height $h_{35}$ may be further increased.

Embodiment 3

A reactor according to Embodiment 3 will be described with reference to FIG. 5B. Here, a first composite core 30B will be described in detail.

As with the first composite core 30B shown in FIG. 5B, a compact 35 made of a composite material does not have a protruding portion 351. That is to say, the protruding portion 351 may be omitted. The composite core 30B has a shape such that two opposing corner portions of a comparatively flat rectangular cuboid are chamfered.

Also, the first composite core 30B shown in FIG. 5B has a multilayer structure in which a plurality of compacts 35 made of a composite material are provided. The composite core 30B of this example has a three-layer structure in which two compacts 35 made of a composite material are provided sandwiching one powder compact 39 in a vertical direction.

The powder compact 39 provided in the first composite core 30B has a rectangular cuboid shape. However, the height $h_{39}$ of this powder compact 39 is smaller than the height $h_{39}$ of the powder compact 39 provided in the first composite core 30 shown in FIG. 4, and is substantially equal to the height $h_{31}$ (see FIG. 3) of the inner core portion 31.

Each compact 35 made of the composite material provided in the first composite core 30B constitutes a portion that protrudes in the height direction relative to the powder compact 39, that is, a portion that protrudes in the height direction relative to a virtual surface obtained by extending the outer circumferential surface of the inner core portions 31. Each compact 35 made of the composite material has a shape such that two opposing corner portions of a comparatively flat rectangular cuboid are chamfered. The compacts 35 made of the composite material are arranged such that the composite core 30B has a substantially line-symmetric shape with respect to a bisector in the height direction.

The number of stacked compacts can be changed by changing the size of the compacts that constitute the composite core in this manner. Note that, as with the first composite core 30 shown in FIG. 4 and the first composite core 30A shown in FIG. 5A, the composite core may have an asymmetrical shape with respect to the bisector in the height direction.

The first composite core 30B has a larger content ratio of the compacts 35 made of a composite material, compared to the composite core 30 shown in FIG. 4, and thus, it is possible to construct a magnetic core that is less likely to be magnetically saturated. Also, magnetic flux leaking from the composite core 30B is reduced due to the upper and lower sides of the powder compact 39 in the height direction being sandwiched by the compacts 35 made of the composite material, and thus a magnetic core with low loss is constructed.

Embodiments 4 and 5

Figure 6:
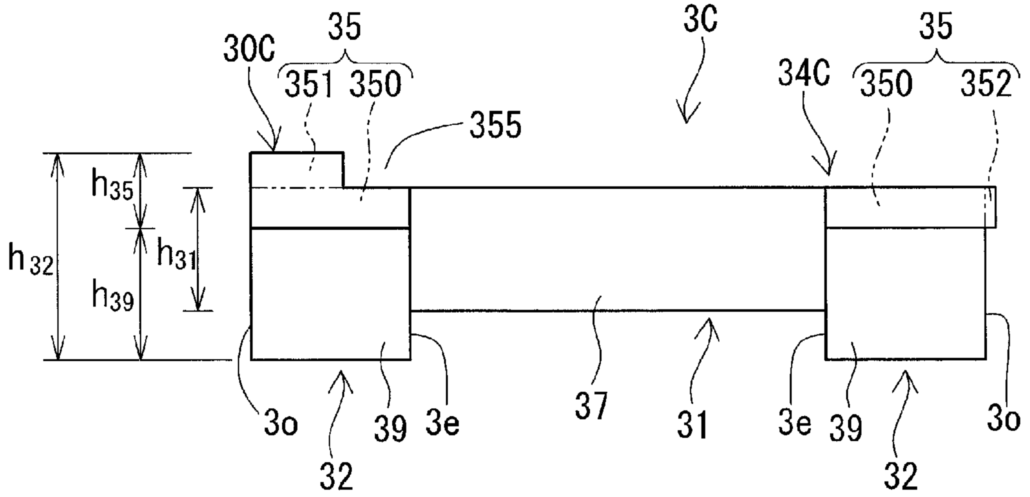
FIG. 6 is a schematic side view showing a magnetic core provided in a reactor of Embodiment 4.
Figure 7:
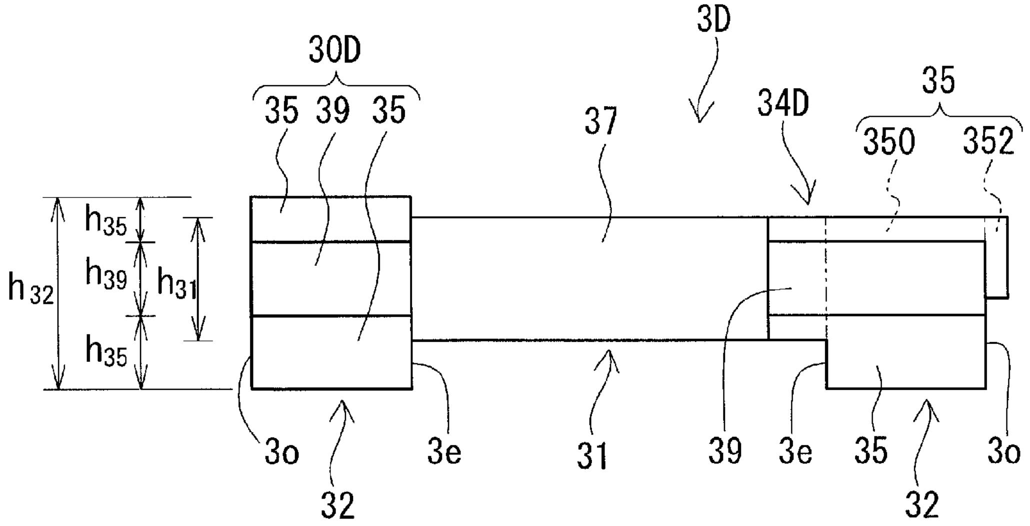
FIG. 7 is a schematic side view showing a magnetic core provided in a reactor of Embodiment 5.

Reactors according to Embodiments 4 and 5 will be described respectively with reference to FIGS. 6 and 7. FIGS. 6 and 7 only show magnetic cores 3C and 3D, and the other constituent elements of the reactors are not shown therein.

FIGS. 6 and 7 are side views of the magnetic cores 3C and 3D when viewed in a direction in which winding portions are arranged side-by-side in a state in which the reactors are installed where the lower side in the paper plane is regarded as the side where the reactor is installed. The above-described arrangement direction corresponds to a direction perpendicular to the paper plane in FIGS. 6 and 7. Also, FIGS. 6 and 7 virtually show the boundary between a base portion 350 and a protruding portion 351, and the boundary between the base portion 350 and an overhang portion 352, which will be described later, in the compacts 35 made of the composite material, using line-double dashed lines.

In the reactor of Embodiment 4 shown in FIG. 6, the magnetic core 3C includes a first composite core 30C and a second composite core 34C, and the first composite core 30C and the second composite core 34C have different shapes and different sizes. Similarly, in the reactor of Embodiment 5 shown in FIG. 7, the magnetic core 3D includes a first composite core 30D and a second composite core 34D, and the first composite core 30D and the second composite core 34D have different shapes and different sizes.

The following describes the magnetic cores 3C and 3D in detail.

Embodiment 4

The magnetic core 3C provided in the reactor of Embodiment 4 includes the first composite core 30C and the second composite core 34C that mainly constitute the outer core portions 32, and the compacts 37 made of a composite material that mainly constitute the inner core portions 31.

Similarly to the first composite core 30 shown in FIG. 3, the first composite core 30C of this example includes one compact 35 made of the composite material and one powder compact 39. The compact 35 made of the composite material includes a base portion 350, a protruding portion 351, and a recess 355. However, the position of the interface between the compact 35 made of the composite material and the powder compact 39 is different from that of the composite core 30 shown in FIG. 3. The position of the above-described boundary in the composite core 30 is located at an intermediate position in the height direction, with respect to end surfaces of the compacts 37 made of the composite material that constitute the inner core portions 31. The size of the two compacts is adjusted to achieve such an arrangement state. Note that the interface is arranged substantially parallel to the direction of magnetic flux. The direction of magnetic flux corresponds to the left-right direction in the paper plane in FIG. 6.

The powder compact 39 of this example has a rectangular cuboid shape. Similarly to Embodiment 1, this powder compact 39 has a portion that protrudes downward in the height direction relative to a virtual surface obtained by extending the outer circumferential surface of the inner core portions 31, in particular, a surface thereof on the lower side in the height direction. However, only a portion of the end surfaces of the compacts 37 made of the composite material are in contact with one surface of the outer circumferential surface of the powder compact 39 that constitutes the inner end surface 3*e*.

The compacts 35 made of the composite material have a step shape in which a rectangular cuboid protruding portion 351 having a shorter axial length than a rectangular cuboid base portion 350 is disposed on the outer end surface 3*o* side of the base portion 350. Here, the base portion 350 is a rectangular cuboid portion that has a width and an axial length that are respectively equal to the width and the axial length of the powder compact 39, and that has a height from a surface of the powder compact 39 located on the upper side in the height direction to a surface of the outer circumferential surface of the inner core portions 31 located on the upper side in the height direction. The same applies to the second composite cores 34C and 34D, which will be described later. The surface of the base portion 350 located on the upper side in the height direction is flush with the surfaces of the above-described inner core portions 31 located on the upper side in the height direction. The protruding portion 351 extends upward from the base portion 350. Thus, the protruding portion 351 constitutes a portion that protrudes upward in the height direction relative to the virtual surface obtained by extending the outer circumferential surface of the inner core portions 31. Also, the above-described upper surface of the base portion 350 and one surface of the protruding portion 351 form a recess 355 in which the linking portion 2*j* (see FIG. 3) of the coil 2 is disposed. That is, the entire inner circumferential surface forming the recess 355 is composed of the compact 35 made of the composite material in the first composite core 30C.

In this example, the width of the protruding portion 351 is equal to the width of the base portion 350. The maximum height $h_{32}$ of the outer core portion 32 corresponds to the sum of the height $h_{35}$ of the compact 35 made of the composite material and the height $h_{39}$ of the powder compact 39, and is larger than the height $h_{31}$ of the inner core portion 31.

Similarly to the above-described first composite core 30C, the second composite core 34C of this example includes one compact 35 made of the composite material and one powder compact 39. The shape and size of the powder compacts 39 provided in the composite core 34C, and the arrangement state thereof with respect to the inner core portions 31 are the same as those of the powder compact 39 provided in the first composite core 30C. Therefore, the interface between the compact 35 made of the composite material and the powder compact 39 in the composite core 34C is also located at an intermediate position in the height direction, with respect to end surfaces of the compacts 37 made of the composite material that constitute the inner core portions 31.

However, the compact 35 made of the composite material provided in the second composite core 34C is a rectangular cuboid, and does not have a step shape. The compact 35 made of the composite material has a shape in which the protruding portion 351 is removed from the compact 35 made of the composite material provided in the first composite core 30C, and only the base portion 350 is present. Therefore, the surface on the upper side in the height direction of the compact 35 made of the composite material provided in the composite core 34C is flush with the surface of the inner core portions 31 located on the upper side in the height direction.

Furthermore, in this example, the compact 35 made of the composite material that constitutes the second composite core 34C includes a rectangular cuboid base portion 350 and an overhang portion 352 that protrudes from the base portion 350 in the axial direction of the magnetic core 3C. As described above, the axial length of the base portion 350 is equal to the axial length of the powder compact 39 that constitutes the composite core 34C. Because of this, the overhang portion 352 protrudes outward in the axial direction of the winding portions relative to the outer end surface 3*o* of the powder compact 39 that constitutes the composite core 34C, and protrudes rightward in the left-right direction in the paper plane in FIG. 6.

The protruding length of the overhang portion 352 from the outer end surface 3*o* of the powder compact 39 can be selected as appropriate. The larger the protruding length is, the further the content ratio of the compact 35 made of the composite material in the second composite core 34C can be increased, and the less likely the magnetic core 3C is to be magnetically saturated. However, the axial length of the magnetic core 3C is likely to be long, and the size of the magnetic core 3C cannot be easily reduced. If there is demand for further reducing the size thereof, the above-described protruding length may range from 5% to 15% of the axial length of the powder compact 39, for example.

With the reactor according to Embodiment 4, the first composite core 30C and the second composite core 34C have different shapes and different sizes, and thus the composite cores 30C and 34C can be easily made compatible to the shape of the portions where the composite cores 30C and 34C are to be disposed.

The first composite core 30C disposed on the one end side of the winding portions 2*a* and 2*b* (see FIG. 3), that is, on the linking portion 2*j* side, includes a recess 355. Therefore, it is possible to increase the height of the protruding portion 351 while avoiding contact with the linking portion 2*j*. As a result, the reactor is less likely to be magnetically saturated. The interface between the compact 35 made of the composite material and the powder compact 39 is arranged at an intermediate position of the inner core portions 31 in the height direction, and thus the reactor of this example is unlikely to be magnetically saturated.

Alternatively, the second composite core 34C disposed on the other end side of the winding portions 2*a* and 2*b*, that is, the second composite core 34C disposed opposite to the linking portion 2*j* side, is provided with the overhang portion 352. The overhang portion 352 can be used as a terminal block, for example. That is, the magnetic core 3C includes a terminal block as a single body. Such a reactor according to Embodiment 4 is small in that the axial length of the reactor that includes the terminal block can be readily shortened. Note that the terminal block refers to a base for fixing a terminal fitting. The terminal fitting is attached to an end portion of the winding wire 2*w* (see FIG. 1) constituting the coil 2, or an end portion of the wire connected to the coil 2.

Embodiment 5

A magnetic core 3D provided in the reactor according to Embodiment 5 includes a first composite core 30D, a second composite core 34D, and compacts 37 made of a composite material. The first composite core 30D mainly constitutes an outer core portion 32 disposed on the one end side of the winding portions 2*a* and 2*b*, that is, on the linking portion 2*j* side. A portion of the second composite core 34D mainly constitutes the outer core portion 32 disposed on the other end side of the winding portions 2*a* and 2*b*, that is, on the side opposite to the linking portion 2*j* side. Another portion of the composite core 34D constitutes a portion of the inner core portions 31. The compacts 37 made of the composite material mainly constitute the inner core portions 31. Note that the above-described linking portion 2*j* side corresponds to the left side in FIG. 7, and the side opposite to the linking portion 2*j* corresponds to the right side in FIG. 7.

Similarly to the first composite core 30B shown in FIG. 5B, the first composite core 30D of this example has a three-layer structure in which two compacts 35 made of the composite material and one powder compact 39 are provided. Both compacts are rectangular cuboids, and the compact 35 disposed on the upper side in the height direction does not include a protruding portion 351 or a recess 355. The compact 35 made of the composite material disposed on the upper side in the height direction may have such a simple. Similarly to Embodiment 4 described above, the position of the interface between the upper compact 35 made of the composite material and the powder compact 39 and the position of the interface between the powder compact 39 and the lower compact 35 made of the composite material are located at intermediate positions in the height direction with respect to end surfaces of the compacts 37 made of the composite material. The size of each compact is adjusted such that the positions of the interfaces are located at the intermediate positions. Note that the interfaces are arranged substantially parallel to the direction of magnetic flux, that is, the left-right direction in the paper plane in FIG. 7.

In this example, the height $h_{35}$ is adjusted such that the upper compact 35 made of the composite material has a portion that protrudes upward in the height direction relative to a virtual surface obtained by extending the outer circumferential surface of the inner core portions 31. The protruding height of the above-described portion that protrudes outward is set such that the portion does not interfere with the linking portion 2*j* of the coil 2. That is to say, the above-described protruding height refers to a height to the lower end of the linking portion 2*j*. The protruding height refers to the distance from a surface on the upper side in the height direction of the virtual surface in the inner core portion 31 to the surface on the upper side in the height direction of the upper compact 35 made of the composite material. A height $h_{39}$ of the powder compact 39 is smaller than a height $h_{31}$ of the inner core portion 31. The height $h_{35}$ is adjusted such that the lower compact 35 made of the composite material has a portion that protrudes downward in the height direction relative to the virtual surface in the inner core portions 31.

In this example, the compacts 35 made of the composite material have the same width and the same axial length, which are respectively equal to the width and the axial length of the powder compacts 39. The maximum height $h_{32}$ of the outer core portion 32 corresponds to the sum ($2 \times h_{35} + h_{39}$) of the height $h_{35}$ of the two compacts 35 made of the composite material and the height $h_{39}$ of one powder compact 39, and is larger than the height $h_{31}$ of the inner core portions 31.

Similarly to the above-described first composite core 30D, the second composite core 34D of this example has a three-layer structure in which two compacts 35 made of the composite material and one powder compact 39 are provided. Also, similarly to the above-described first composite core 30D, the interfaces between the compacts 35 made of the composite material and the powder compact 39 in the composite core 34D are located at intermediate positions in the height direction, with respect to end surfaces of the compacts 37 made of the composite material.

In particular, the second composite core 34D includes a portion that constitutes a portion of the inner core portion 31 and a portion that constitutes the outer core portion 32. Therefore, the maximum axial length of the composite core 34D is longer than the axial length of the first composite core 30D. Also, the height of the composite core 34D locally changes.

In the second composite core 34D of this example, the powder compact 39 has a rectangular cuboid shape. The planar shape of the upper compact 35 made of the composite material is U-shaped when viewed in the height direction, and L-shaped when viewed in the width direction. Also, the upper compact 35 made of the composite material includes a base portion 350 and an overhang portion 352 disposed in a direction orthogonal to the base portion 350. The overhang portion 352 has a rectangular cuboid shape, and is linked to the base portion 350 to cover a portion of the outer end surface 3*o* of the powder compact 39. A large volume of the compact 35 made of the composite material is secured by such an overhang portion 352. The planar shape of the lower compact 35 made of the composite material is U-shaped when viewed in the height direction, and L-shaped when viewed in the width direction. Also, the lower compact 35 made of the composite material includes a portion with a comparatively small height and a portion with a comparatively large height. The portion with a comparatively large height refers to a portion having a height $h_{35}$.

With the second composite core 34D, a portion in which a portion of the base portion 350 in the upper compact 35 made of the composite material, a portion of the powder compact 39, and the portion with a comparatively smaller height in the lower compact 35 made of the composite material are stacked together constitutes a portion of the inner core portion 31. A portion in which the other portion of the base portion 350 and the overhang portion 352 in the upper compact 35 made of the composite material, the other portion of the powder compact 39, and the portion with a comparatively larger height in the lower compact 35 made of the composite material are stacked together constitutes the outer core portion 32.

The protruding length of the overhang portion 352 can be selected as appropriate. The protruding length refers to the length thereof from the surface of the powder compact 39 that constitutes the outer end surface 3*o*, along the axial direction of the magnetic core 3D. Refer to Embodiment 4 described above for the magnitude of the protruding length. The larger the height of the overhang portion 352 is, the higher the content ratio of the compact 35 made of the composite material in the second composite core 34D is. Therefore, the magnetic core 3D is less likely to be magnetically saturated. The overhang portion 352 may have a height such that the lower end of the overhang portion 352 in the height direction reaches the surface of the lower compact 35 made of the composite material located on the lower side in the height direction, here, the surface on the installation side, for example. If the upper compact 35 made of the composite material has an L-shape as in this example, the overhang portion 352 can be used as a member for positioning the powder compact 39, thus preventing positional shift. It is expected that the larger the height of the overhang portion 352 is, the more appropriately the overhang portion 352 can be used as a positioning member. The height of the overhang portion 352 may range from 5% to 100% of the height of the composite core 34D, for example.

Similarly to Embodiment 4, with the reactor according to Embodiment 5 as well, the first composite core 30D and the second composite core 34D have different shapes and different sizes, and thus the composite cores 30D and 34D can be easily made compatible to the shape of the portions where the composite cores 30D and 34D are to be disposed. In particular, although the first composite core 30D has a portion that protrudes in the height direction relative to the above-described virtual surface in the inner core portion 31, it is possible to avoid contact with the linking portion 2*j*. Also, because the first composite core 30D has the protruding portion, the reactor of Embodiment 5 is unlikely to be magnetically saturated, and the size of the reactor of Embodiment 5 can be further reduced due to the protruding height being smaller than that of Embodiment 4 or the like. Similarly to Embodiment 4, the axial length of the reactor that includes a terminal block can be readily reduced due to the second composite core 34D being provided with the overhang portion 352.

Furthermore, in the reactor of Embodiment 5, the first composite core 30D and the second composite core 34D have a three-layer structure, and the content ratio of the compacts 35 made of the composite material is high. Also, because the second composite core 34D constitutes a portion of the inner core portion 31, the content ratio of the compact 35 made of the composite material is high. In these respects, the reactor of Embodiment 5 is less likely to be magnetically saturated. Also, magnetic flux leaking from the composite cores 30D and 34D is reduced due to the upper and lower sides of the powder compact 39 in the height direction being sandwiched by the compacts 35 made of the composite material. The above-described leakage flux can be readily reduced due to the overhang portion 352 covering at least a portion of the outer end surface 3*o* of the powder compact 39. In these respects, the reactor of Embodiment 5 has low loss.

Note that the overhang portions 352 provided in the second composite cores 34C and 34D may be omitted from Embodiments 4 and 5. In this case, similarly to the first composite cores 30C and 30D, the outer end surfaces 3*o* of the composite cores 34C and 34D are composed of flat surfaces by the compacts 35 made of the composite material and the powder compacts 39. The axial length of such magnetic cores 3C and 3D can be further reduced, and thus a reduction in the size thereof can be realized.

Embodiment 6

A reactor according to Embodiment 6 will be described with reference to FIGS. 8A and 8B.

Figure 8A:
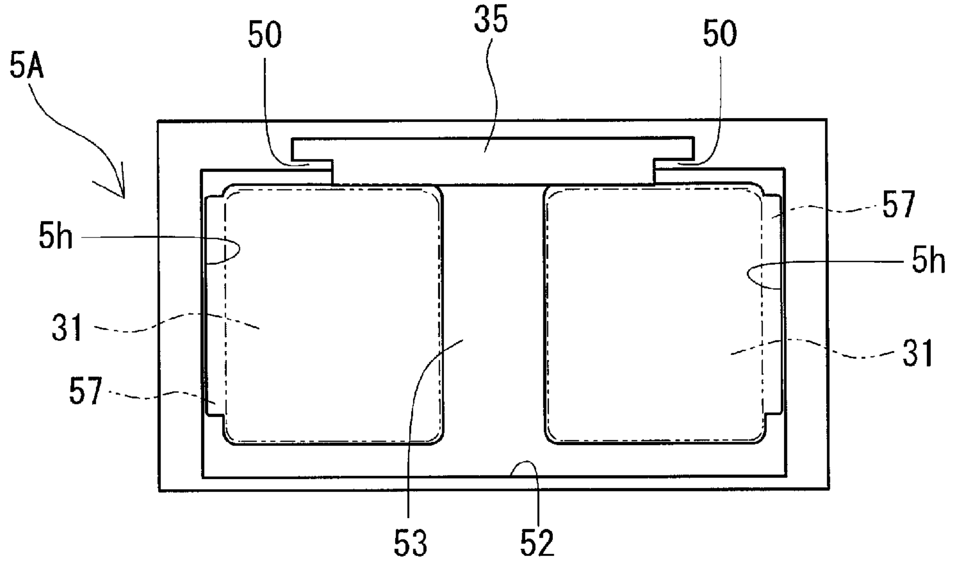
FIG. 8A is a schematic front view of another example of a holding member provided in a reactor of Embodiment 6, when viewed from the side on which an outer core portion is disposed in an axial direction of a through-hole.

FIG. 8A is a front view of a holding member 5A provided in the reactor of Embodiment 6, when viewed from the core side in the axial direction of through-holes 5*h*. FIG. 8B is a front view showing a state in which a powder compact 39 is disposed on the holding member 5A shown in FIG. 8A.

Figure 8B:
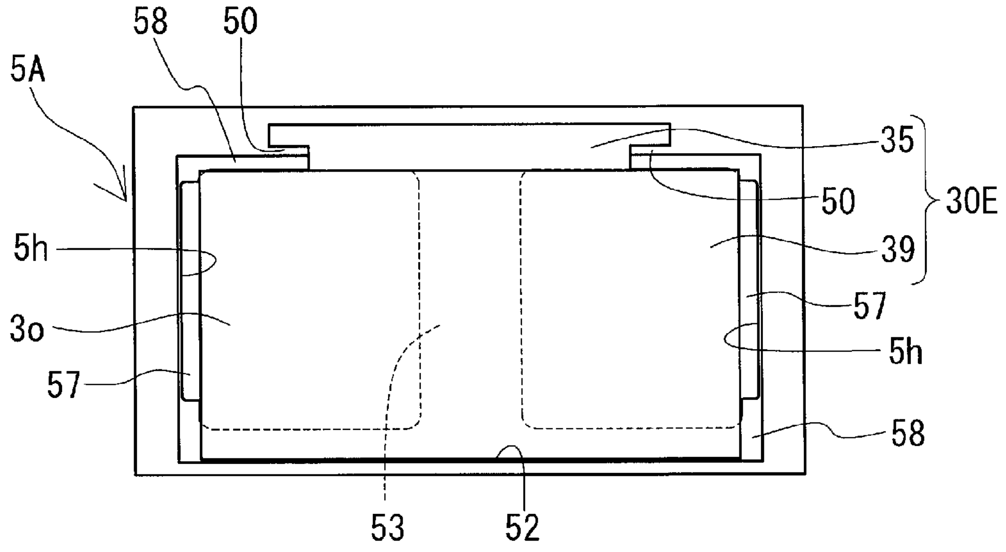
FIG. 8B is a schematic front view showing a state in which a first composite core is disposed in the holding member shown in FIG. 8A.

The reactor of Embodiment 6 is provided with the frame-shaped holding member 5A for holding end surfaces of the two winding portions 2*a* and 2*b* (FIG. 1) and a first composite core 30E (FIG. 8B). The overview of the holding member 5A is as described in Embodiment 1. In particular, the holding member 5A provided in the reactor of Embodiment 6 is provided with the compact 35 made of the composite material that constitutes a composite core 30E, as a single body. The following describes the holding member 5A in detail.

As shown in FIG. 8A, the holding member 5A of this example has a rectangular frame shape, and has two rectangular through-holes 5*h*. The opening area of each through-hole 5*h* is larger than the area of an end surface of a core member that constitutes an inner core portion 31. In this example, the width of each through-hole 5*h* at the inner circumferential edge is larger than the width of the inner core portion 31. Therefore, a region on the outer side in the width direction of the through-hole 5*h* is provided with a gap 57 without being covered by the inner core portion 31 in a state in which the inner core portion 31 is inserted into the through-hole 5*h*. The gaps 57 extend between the inner circumferential surfaces of the winding portions 2*a* and 2*b* (FIG. 1) and the inner core portions 31. As shown in FIG. 8B, the gaps 57 are maintained even in a state in which the powder compact 39 is disposed. Therefore, the gaps 57 can be used as a flow path in which an inner resin portion is formed in the process for manufacturing the resin molded portion 6.

A rectangular groove portion 52 is provided on the core side of the holding member 5A. A bottom portion 53 of the groove portion 52 is provided with the through-holes 5*h*. The opening area of the groove portion 52 is adjusted such that gaps 58 are provided at two surfaces in the width direction and a portion of the surface on the upper side in the height direction of the outer circumferential surface of the powder compact 39, and the inner wall surface of the groove portion 52 in a state in which the powder compact 39 is disposed as shown in FIG. 8B. The gaps 58 can be used as a flow path for forming an outer resin portion 60 or the like (FIG. 1) in the process for manufacturing the resin molded portion 6. Portions of the gaps 58 overlap with the above-described gaps 57.

The compact 35 made of the composite material is formed as a single body with the holding member 5A so as to divide a central portion in the width direction of an upper region in the height direction of the opening edge of the groove portion 52. The above-described height direction corresponds to the up-down direction in the paper plane in FIGS. 8A and 8B.

As shown in FIG. 8A, the compact 35 made of composite material of this example is T-shaped. An upper frame portion in the height direction of the holding member 5A has a pair of claw portions 50 holding the two ends of a T-shaped horizontal bar portion in the compact 35 made of the composite material. As a result of the compact 35 made of the composite material being supported by the two claw portions 50, it is possible to prevent the compact 35 made of the composite material from coming loose from the holding member 5A. Note that the shape of the compact 35 made of the composite material can be changed as appropriate. The shape of the compact 35 made of the composite material may be a rectangular cuboid, for example. However, if the compact 35 made of the composite material has a shape in which the width of the upper region in the height direction is smaller than the width of the lower region thereof, for example, a trapezoidal shape, the holding member 5A is provided with the claw portions 50 or the like, and thus the compact 35 made of the composite material can be readily prevented from coming loose.

The width, height, axial length, and the like of the compact 35 made of the composite material can be selected as appropriate in consideration of the manufacturability regarding the holding member 5A, the workability of assembling a reactor, the manufacturability regarding the resin molded portion 6 (FIG. 1), and the like. If there is demand for preventing the compact 35 from coming loose as described above, for example, it is preferable that the width of a surface of the compact 35 made of the composite material that is in contact with an upper surface in the height direction of the powder compact 39 is smaller than the width of the powder compact 39 as in this example.

Also, the surface of the compact 35 made of the composite material of this example that is in contact with the above-described upper surface of the powder compact 39 is a flat surface. The flat surface that is in contact with the powder compact 39 is provided such that the interface between the compact 35 made of the composite material and the powder compact 39 is arranged substantially parallel to the direction of magnetic flux. Also, the flat surface is provided to be substantially flush with an upper region in the height direction of the inner circumferential edge of the through-hole 5*h*. Therefore, similarly to Embodiment 1, the above-described interface is located at substantially the same height as that of the surface of the outer circumferential surface of the inner core portions 31 on the upper side in the height direction.

As shown in FIG. 8B, the compact 35 made of the composite material and the powder compact 39 are stacked together due to the powder compact 39 being fitted to the groove portion 52 on the core side of the holding member 5A. If the first composite core 30E has a multilayer structure including three layers or more as in Embodiments 3 and 5, each compact may be fitted to the groove portion 52. The holding member 5A and the stacked article thereof are assembled through this fitting operation. The outer resin portion 60 covering the stacked article and the like are formed by filling resin for the resin molded portion 6 from the outer end surface 3*o* side of the powder compact 39 in this assembled state.

With the reactor of Embodiment 6, by assembling the holding member 5A and the powder compact 39 as described above, it is possible to stack the compact 35 made of the composite material and the powder compact 39 together and to attach the holding member 5A to the resulting stacked article simultaneously. Also, the stacked state of the above-described stacked article can be easily maintained by the holding member 5A. In this regard, the reactor of Embodiment 6 has better manufacturability.

In the reactor of this example, the gap 58 is present between the opening edge of the groove portion 52 in the holding member 5A and the powder compact 39, and the outer resin portion 60 and the like can be formed to fill this gap 58. The gap 58 is in communication with the gap 57, and an inner resin portion can also be formed to fill the gap 57 via the gap 58. The reactor of Embodiment 6 has high manufacturability from the viewpoint that the resin molded portion 6 can be easily formed in this manner. Also, the interface between the compact 35 made of the composite material and the powder compact 39 is covered by the resin molded portion 6, and thus the rigidity and strength of a magnetic core as a single article can be increased. Therefore, the reactor of Embodiment 6 has high strength.

The present disclosure is not limited to these examples, but is indicated by the claims, and all changes that come within the meaning and range of equivalency of the claims are intended to be embraced therein.

At least one of the following changes can be made to Embodiments 1 to 6 described above, for example.

(Variation A) An outer core portion disposed on the other end side in the axial direction of the two winding portions, that is, on the side opposite to the linking portion, is constituted by a member other than the composite core.

The outer core portion may be composed of a powder compact or a compact made of a composite material, for example. Alternatively, the outer core portion may be composed of two or more compacts selected from compacts made of a composite material, powder compacts, and compacts obtained by stacking plate materials made of a soft magnetic material, and sintered compacts. However, the above-described combinations do not include a combination of a compact made of a composite material and a powder compact. A typical example of the compact obtained by stacking plate materials include a compact in which plate materials are stacked together, such as electrical steel sheets. A typical example of the sintered compact includes a ferrite core.

(Variation B) Members that constitute the inner core portion include composite cores.

A portion of the second composite core 34D shown in FIG. 7 that constitutes the inner core portions 31 may be extended, for example. Alternatively, the magnetic core may include composite cores that constitute the inner core portions, separately from the composite cores that constitute the outer core portions.

(Variation C) If the composite core is a stacked article having a three layers or more, the composite core includes a compact made of a constituent material other than the compact made of a composite material and the powder compact.

In addition to the compact made of a composite material and the powder compact, the composite core may include the above-described compact in which plate materials made of the soft magnetic material are stacked together, a sintered compact, or the like, for example.

(Variation D) The position at which a linking portion of a coil is arranged satisfies the following.

A description will be given using FIG. 3. The linking portion 2*j* shown in FIG. 3 is provided at a position that is flush with surfaces on the upper side in the height direction of the two winding portions 2*a* and 2*b*. In Variation D, the linking portion 2*j* is provided at a position located higher than the above-described upper surfaces of the two winding portions 2*a* and 2*b*, for example. In this case, a larger dead space is present between the virtual surface obtained by extending the outer circumferential surface of the inner core portions 31 and the upper end of the linking portion 2*j*. The first composite core may be provided to reduce the size of this dead space.

(Variation E) The winding portions are constituted by two independent winding wires.

In this case, the linking portion preferably connects the two one end portions of the one end portions of the winding wires respectively drawn out from the winding portions to each other. The connection between end portions include a form in which end portions of winding wires are directly connected to each other, and a form in which end portions thereof are indirectly connected to each other. Welding, crimping, or the like can be used for direct connection. Appropriate fittings or the like to be attached to end portions of the winding wires can be used for indirect connection.

(Variation F) A reactor including at least one of the following. All variations are not shown in the drawings.

(F-1) A reactor including a sensor for measuring a physical quantity of the reactor, such as a temperature sensor, an electric current sensor, a voltage sensor, or a magnetic flux sensor.

(F-2) A reactor including a heat dissipation plate to be attached to at least a portion of an outer circumferential surface of winding portions of a coil.

Examples of the heat dissipation plate include metal plates, and plate materials made of a nonmetal inorganic material with high thermal conductivity.

(F-3) A reactor including a joining layer interposed between a surface on the reactor installation side and an installation target or the above-described heat dissipation plate.

An example of the joining layer includes an adhesive layer. An adhesive having better electrical insulating properties is preferable because the insulating properties between the winding portions and the heat dissipation plate can be improved by the adhesive layer, even if the heat dissipation plate is a metal plate.

(F-4) A reactor including an attachment portion that is formed on an outer resin portion as a single body and is for fixing a reactor to an installation target.

The invention claimed is:

1. A reactor comprising:
- a coil;
- a magnetic core; and
- a resin molded portion covering at least a portion of an outer circumferential surface of the magnetic core;
- wherein the coil includes
  - two winding portions and a linking portion for connecting the two winding portions to each other,
- the magnetic core includes
  - inner core portions respectively disposed inside the winding portions, and outer core portions disposed outside the two winding portions,
- at least one of the two outer core portions includes
  - a composite core whose height direction is orthogonal to an axial direction of the winding portions and a direction in which the two winding portions are arranged side-by-side, and in which a compact made of a composite material containing magnetic powder and resin and a powder compact made of magnetic powder are stacked in the height direction,
- the linking portion protrudes outward in the axial direction and upward in the height direction relative to end portions of the inner core portions, on one end side in the axial direction of the two winding portions,
- the composite core
  - is disposed on the one end side in the axial direction of the two winding portions,
  - has a portion that protrudes upward in the height direction relative to a virtual surface obtained by extending an outer circumferential surface of the inner core portions, and
  - includes a first composite core in which the compact made of the composite material is disposed on an upper side in the height direction, and the powder compact is stacked on a lower side in the height direction, wherein the powder compact extends from an outer surface of the at least one of the two outer core portions to the inner core portion, and the resin molded portion includes a first outer resin portion covering the first composite core.

2. The reactor according to claim 1, wherein a thickness of a central portion of the compact made of the composite material that constitutes the first composite core located in the direction in which the two winding portions are arranged side-by-side is larger than a thickness of two end portions located in the direction in which the two winding portions are arranged side-by-side.

3. The reactor according to claim 1, wherein the linking portion is obtained by bending a portion of a winding wire constituting the two winding portions, the first composite core has a recess in which the linking portion is disposed, and the compact made of the composite material that constitutes the first composite core constitutes at least a portion of an inner circumferential surface forming the recess.

4. The reactor according to claim 1, further comprising:

a frame-shaped holding member for holding end surfaces of the two winding portions and the first composite core, wherein the holding member is formed as a single body with the compact made of the composite material that constitutes the first composite core.

5. The reactor according to claim 1, wherein the composite core is disposed on another end side in the axial direction of the two winding portions, and includes a second composite core having a portion protruding in the height direction relative to the virtual surface of the inner core portions, the resin molded portion includes a second outer resin portion covering the second composite core, and the compact made of the composite material that constitutes the second composite core is provided with an overhang portion that protrudes outward in the axial direction of the winding portions relative to the powder compact that constitutes the second composite core.

6. The reactor according to claim 1, wherein the inner core portions include a compact made of a composite material containing magnetic powder and resin.

7. The reactor according to claim 1, wherein a relative magnetic permeability of the compact made of the composite material ranges from 5 to 50, and a relative magnetic permeability of the powder compact is two times or more the relative magnetic permeability of the compact made of the composite material.

8. The reactor according to claim 7, wherein the relative magnetic permeability of the powder compact ranges from 50 to 500.

* * * * *